US008553085B2

(12) United States Patent
Kato et al.

(10) Patent No.: US 8,553,085 B2
(45) Date of Patent: Oct. 8, 2013

(54) SITUATION MONITORING DEVICE AND SITUATION MONITORING SYSTEM

(75) Inventors: Masami Kato, Sagamihara (JP); Masakazu Matsugu, Yokohama (JP); Katsuhiko Mori, Kawasaski (JP); Hiroshi Sato, Kawasaki (JP); Yusuke Mitarai, Tokyo (JP); Yuji Kaneda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1717 days.

(21) Appl. No.: 11/597,061

(22) PCT Filed: Jun. 6, 2005

(86) PCT No.: PCT/JP2005/010724
§ 371 (c)(1), (2), (4) Date: Nov. 20, 2006

(87) PCT Pub. No.: WO2005/119620
PCT Pub. Date: Dec. 15, 2005

(65) Prior Publication Data

US 2008/0211904 A1 Sep. 4, 2008

(30) Foreign Application Priority Data

Jun. 4, 2004 (JP) ................................ 2004-167544
Jun. 3, 2005 (JP) ................................ 2005-164875

(51) Int. Cl.
*H04N 7/18* (2006.01)
*H04N 15/00* (2006.01)

(52) U.S. Cl.
USPC ............................................ 348/143; 348/48

(58) Field of Classification Search
USPC .................................................. 348/143, 48
See application file for complete search history.

(56) References Cited

U.S. PATENT DOCUMENTS 4,613,964 A 9/1986 Ichikawa et al.
5,210,785 A 5/1993 Sato et al.
5,231,394 A 7/1993 Sato
5,517,553 A 5/1996 Sato
5,539,678 A 7/1996 Tanaka et al.

(Continued)

FOREIGN PATENT DOCUMENTS

CN 1313803 A 9/2001
JP 1-268570 A 10/1989

(Continued)

OTHER PUBLICATIONS

U.S. Appl. No. 10/592,954, filed May 8, 2007.

(Continued)

*Primary Examiner* — Thomas Dailey
*Assistant Examiner* — Ebrahim Golabbakhsh
(74) *Attorney, Agent, or Firm* — Fitzpatrick, Cella, Harper & Scinto

(57) ABSTRACT

A situation monitoring device which enables monitoring of a variety of situations and reporting in response to the situation using a single device is provided. The situation monitoring device is easy to install and to use and a system therefore can be implemented inexpensively. The situation monitoring device recognizes a place or installation where the device is installed (step S102), holds relational information correlating the place of installation and the situation to be recognized and determines a predetermined situation to be recognized according to place of installation recognition results and the relational information (step S104), recognizes a determined predetermined situation (step S106), and reports the result of the predetermined situation to a user (step S108).

25 Claims, 38 Drawing Sheets

(56) References Cited

U.S. PATENT DOCUMENTS

| | | | |
|---|---|---|---|
| 5,565,893 A | 10/1996 | Sato et al. | |
| 5,621,300 A | 4/1997 | Sato et al. | |
| 5,714,698 A | 2/1998 | Tokioka et al. | |
| 5,724,647 A | 3/1998 | Sato | |
| 5,751,133 A | 5/1998 | Sato et al. | |
| 5,805,147 A | 9/1998 | Tokioka et al. | |
| 5,818,429 A | 10/1998 | Tanaka et al. | |
| 5,831,603 A | 11/1998 | Yoshimura et al. | |
| 5,936,207 A | 8/1999 | Kobayashi et al. | |
| 6,259,531 B1 | 7/2001 | Takamiya et al. | |
| 6,415,240 B1 | 7/2002 | Kobayashi et al. | |
| 6,529,802 B1 * | 3/2003 | Kawakita et al. | 700/245 |
| 6,862,019 B2 | 3/2005 | Kobayashi et al. | |
| 6,965,377 B2 | 11/2005 | Yanagisawa et al. | |
| 7,075,524 B2 | 7/2006 | Kobayashi et al. | |
| 2002/0183598 A1 | 12/2002 | Teraura et al. | |
| 2002/0192625 A1 | 12/2002 | Takashi | |
| 2003/0227540 A1 * | 12/2003 | Monroe | 348/14.02 |
| 2003/0229474 A1 * | 12/2003 | Suzuki et al. | 702/188 |
| 2004/0185900 A1 * | 9/2004 | McElveen | 455/556.1 |
| 2006/0202973 A1 | 9/2006 | Kobayashi et al. | |
| 2006/0232568 A1 | 10/2006 | Tanaka et al. | |

FOREIGN PATENT DOCUMENTS

| | | |
|---|---|---|
| JP | 6-251159 A | 9/1994 |
| JP | 10-151086 A | 6/1998 |
| JP | 11-214316 A | 8/1999 |
| JP | 11-283154 | 10/1999 |
| JP | 11283154 A * | 10/1999 |
| JP | 2001-307246 A | 11/2001 |
| JP | 2002-074566 A | 3/2002 |
| JP | 2002-352354 A | 12/2002 |
| JP | 2002-370183 | 12/2002 |
| JP | 2003-296855 | 10/2003 |
| JP | 2004-80074 | 3/2004 |
| JP | 2004-94799 | 3/2004 |
| WO | 99/67067 | 12/1999 |
| WO | 0163576 A2 | 8/2001 |
| WO | 03075243 A1 | 9/2003 |

OTHER PUBLICATIONS

U.S. Appl. No. 11/665,862, filed Apr. 20, 2007.

Chinese Office Action dated Nov. 7, 2008, in corresponding Chinese Patent Application No. 2005800181805.

English language translation of Chinese Office Action dated Nov. 7, 2008.

International Search Report and Written Opinion for corresponding International Application No. PCT/JP2005/010724.

K. Yanai, K. Deguchi, "Recognition of Indoor Images Employing Supporting Relation between Objects", Systems and Computers in Japan, vol. 33, No. 11, pp. 14-26 (2002), translated from "Recognition of Indoor Images Using Support Relations between Objects", Transactions of the Institute of Electronics, Information and Communication Engineers, vol. J84-DII, No. 8, pp. 1741-1752 (2001).

European Search Report dated Dec. 20, 2010 in corresponding European Application No. 05748479.2.

* cited by examiner

FIG. 10

| LOCATION CODE | PERSON WHO IS THE OBJECT OF RECOGNITION CODE | SITUATION RECOGNITION CONTENT |
|---|---|---|
| P0001 | H1001 | IS PERSON IN PAIN? |
| P0002 | H1001 | HAS PERSON FALLEN? |
| P0002 | H1002 | HAS PERSON PUT SOMETHING IN HIS MOUTH? |
| P0004 | H1003 | CONFIRMATION OF ENTRY/EXIT |
| P0003 | | MONITOR PERSON'S INTRUSION |

FIG. 14

| LOCATION CODE | FEATURE PARAMETERS |
|---|---|
| P0001 | P11, P12, P13, ···, P1n |
| P0002 | P21, P22, P23, ···, P2n |
| P0003 | P31, P32, P33, ···, P3n |
| P0004 | P41, P42, P43, ···, P4n |

FIG. 17

| LOCATION CODE | ID CODE |
|---|---|
| P0001 | 1000 |
| P0002 | 1002 |
| P0003 | 3333 |
| P0004 | UNREGISTERED |

F I G. 20

| PERSON WHO IS THE OBJECT OF RECOGNITION CODE | SITUATION RECOGNITION CONTENT |
| --- | --- |
| H1001 | IS PERSON IN PAIN? |
| H1001 | HAS PERSON FALLEN? |
| H1002 | HAS PERSON PUT SOMETHING IN HIS MOUTH? |
| H1003 | CONFIRMATION OF ENTRY/EXIT |
| H9999 | MONITOR PERSON'S INTRUSION |

FIG. 25

| LOCATION CODE | PERSON WHO IS THE OBJECT OF RECOGNITION CODE | REPORTING SITUATION CONTENT | REPORTING DESTINATION | |
|---|---|---|---|---|
| P0001 | H1001 | IS PERSON IN PAIN? | FATHER, MOTHER | |
| | | | | |
| P0002 | H1001 | HAS PERSON FALLEN? | FATHER | |
| P0002 | H1002 | HAS PERSON PUT SOMETHING IN HIS MOUTH? | MOTHER | |
| P0002 | H0002 | IS PERSON IN A PROHIBITED AREA? | OLDER BROTHER | |
| | | | | |
| P0003 | H1003 | CONFIRMATION OF ENTRY/EXIT | MOTHER | |
| P0004 | | MONITOR PERSON'S INTRUSION | SECURITY COMPANY | |
| | | | | |

FIG. 28

| RECOGNITION PROCESS | OUTPUT | ENCODED CHARACTER SEQUENCE |
|---|---|---|
| R0001 | 1 | "FALLEN DOWN" |
| R0001 | 2 | "SLEEPING" |
| R0001 | 3 | "SITTING" |
| R0002 | 1 | "INTRUDER ALERT" |
| R0003 | 1 | "SEEMS TO BE HAPPY" |
| R0003 | 2 | "SEEMS TO BE IN PAIN" |
| R0004 | 1 | "HAS PUT SOMETHING IN HIS/HER MOUTH" |
| R0005 | 1 | "FIRE!" |

FIG. 29

| LOCATION CODE | FEATURE PARAMETERS |
| --- | --- |
| P0001 | P11, P12, P13, ···, P1n |
| P0002 | P21, P22, P23, ···, P2n |
| P0003 | P31, P32, P33, ···, P3n |
| P0004 | P41, P42, P43, ···, P4n |

FIG. 32

| LOCATION CODE | PERSON WHO IS THE OBJECT OF RECOGNITION CODE | REPORTING SITUATION CONTENT | REPORTING DESTINATION | REPORTING MEANS |
|---|---|---|---|---|
| P0001 | H1001 | IS PERSON IN PAIN? | FATHER, MOTHER | INSTANT MESSAGE |
| | | | | |
| P0002 | H1001 | HAS PERSON FALLEN? | FATHER | TELEPHONE |
| P0002 | H1002 | HAS PERSON PUT SOMETHING IN HIS MOUTH? | MOTHER | INSTANT MESSAGE |
| P0002 | H0002 | IS PERSON IN A PROHIBITED AREA? | OLDER BROTHER | INSTANT MESSAGE |
| | | | | |
| P0003 | H1003 | CONFIRMATION OF ENTRY/EXIT | MOTHER | E-MAIL |
| P0004 | | MONITOR PERSON'S INTRUSION | SECURITY COMPANY | TELEPHONE |
| | | | | |

F I G. 34

| LOCATION CODE | PERSON WHO IS THE OBJECT OF RECOGNITION CODE | REPORTING SITUATION CONTENT | TIME | REPORTING DESTINATION | REPORTING MEDIUM |
|---|---|---|---|---|---|
| P0001 | H1001 | IS PERSON IN PAIN? | 0～24 | FATHER, MOTHER | INSTANT MESSAGE |
| | | | | | |
| P0002 | H1001 | HAS PERSON FALLEN? | 0～24 | FATHER | TELEPHONE |
| P0002 | H1002 | HAS PERSON PUT SOMETHING IN YOU'RE HIS MOUTH? | 0～24 | MOTHER | INSTANT MESSAGE |
| P0002 | H0002 | IS PERSON IN A PROHIBITED AREA? | 0～24 | OLDER BROTHER | INSTANT MESSAGE |
| | | | | | |
| P0003 | | INTRUDER CONFIRMED | 8～24 | MOTHER | E-MAIL |
| | | INTRUDER CONFIRMED | 24～8 | SECURITY COMPANY | TELEPHONE |
| | | | | | |

SITUATION MONITORING DEVICE AND SITUATION MONITORING SYSTEM

TECHNICAL FIELD

This invention relates to a situation monitoring device that recognizes a situation of a target object and reports that situation, and a situation monitoring system in which such situation monitoring device is connected to a network, and more particularly, to a situation monitoring device and situation monitoring system used for monitoring a situation.

BACKGROUND ART

With advances in continuous internet access and expanded broadband service there is a growing awareness of security issues, as evidenced recently by the commercialization and widespread sale of video communications equipment for remote monitoring of homes and offices. By utilizing these types of existing video communications equipment, it is possible to construct security systems for observing intrusions by suspicious persons and monitoring the weak, such as the sick, the aged, and children, from a remote location.

However, with a security system like that described above, it is necessary for the user at the remote location to check the video data periodically, and thus it is difficult to respond quickly when a problem arises. Accordingly, although there is also a security system having the ability to detect and report live objects like the system proposed, for example, by Japanese Laid-Open Patent Publication No. 2002-74566, such a system provides no more than the ability to detect and report the intrusion by a person who might be a suspicious person.

In addition, with a security system like that described above, due to privacy concerns arising from the indiscriminate distribution of video data, the situations to which such a system can be adapted are limited. In order to solve such problems, a specialized system has been proposed that does not distribute the video itself but instead recognizes situations specified by the user and performs appropriate processing depending on the situation.

For example, in Japanese Laid-Open Patent Publication No. 2002-352354, a system that recognizes and reports an emergency situation of a person under care, based on information such as response by audio or detection of absence by image recognition, is proposed. In addition, in Japanese Laid-Open Patent Publication No. 10-151086, a system that recognizes the situation inside the bathroom of the user from video data and issues a warning when an emergency is detected is proposed.

However, all these systems are constructed as specialized systems for certain unique situations, and are not a single device capable of being adapted to a variety of situations. Therefore, for example, when attempting to construct a security system adapted to a plurality of objectives, it is necessary to assemble a plurality of specialized devices for handling each and every situation, which increases the size and the cost of the system. Furthermore, these specialized systems are difficult to introduce (requiring construction and the like) and are not easy to install and use. In addition, the composition of a family and the situations of its members change over time, making these types of systems impractical.

By contrast, with recent advances in image processing technology and calculating power, a great many devices have been proposed that recognize ordinary human movements and situations. For example, in Japanese Laid-Open Patent Publication No. 6-251159, a device that converts feature vector sequences obtained from time series images into symbol sequences and selects the most plausible from among the object of recognition categories based on a hidden Markov model. In addition, many techniques for recognizing facial expression have been proposed, such as the device proposed by Japanese Laid-Open Patent Publication No. 11-214316 that recognizes such expressions as pain, excitement and so forth.

However, in attempting to achieve an ordinary movement/situation recognition device (that is, the capacity to recognize a variety of situations using a single device) using these types of techniques, the number of mistaken recognitions increases as the categories of movement that are the object of recognition increase, leading to a further increase in the required processing power.

Furthermore, because these conventional security systems report the same generalized emergency target to a predetermined reporting destination (such as a security firm) whenever any sort of emergency arises, it is difficult to use the device for multiple purposes. For example, in the case of a security system designed to monitor a child, it is preferable that the situation of the child be reported to the mother. Similarly, in the case of a security system designed to monitor emergencies such as the intrusion of a suspicious person or the outbreak of a fire, it is preferable that the emergency be reported to the security firm or the like quickly. However, it has been difficult to get conventional security systems to operate flexibly according to this sort of wide variety of purposes.

DISCLOSURE OF INVENTION

The present invention is conceived as a solution to the problems of the conventional art, and has as an object to provide inexpensively a situation monitoring device and system configured as a single device that that can monitor a variety of situations and report depending on the situation, and further, that is easy to install and to use.

To achieve the foregoing object, a monitoring device according to the present invention has a configuration like that described below, that is, a situation monitoring device comprising:

place recognition means for recognizing a place of installation where the device is installed;

information holding means for holding relational information relating the place of installation and a situation to be recognized;

determination means for determining a predetermined situation to be recognized, in accordance with recognition results by the place recognition means and the relational information;

situation recognition means for recognizing the predetermined situation determined by the determination means; and communications means for reporting the recognition result of the predetermined situation recognized by the situation recognition means to the user.

In addition, to achieve the foregoing object, another monitoring device according to the present invention has a configuration like that described below, that is, a situation monitoring device comprising:

situation analyzing means for analyzing a situation of a target object;

discrimination means for identifying a predetermined situation from output from the situation analysis means;

situation encoding means configured to convert the situation into a predetermined signal based on the output from the situation analysis means; and communications means for reporting the output of the situation analysis means to the user using the situation encoding means.

According to the present invention, it is possible to provide a situation monitoring device and system configured as a single device that that can monitor a variety of situations as well as report depending on the situation, and further, that is easy to install and to use.

Other features and advantages of the present invention will be apparent from the following description when taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 10 is a diagram showing a sample recognition information table indicating the relation between place of installation, a person who is an object of recognition and situation recognition contents;

FIG. 14 is a diagram showing a table indicating the relation between location code and feature parameters;

FIG. 17 is a diagram showing a sample management table;

FIG. 20 is a diagram showing a sample recognition information table indicating the relation between a person who is an object of recognition and situation recognition contents;

FIG. 25 is a diagram showing a sample report control information table;

FIG. 28 is a diagram showing a sample conversion table;

FIG. 29 is a diagram showing a table indicating the relation between location code and feature parameters;

FIG. 32 is a diagram showing the contents of the report control information table;

FIG. 34 is a diagram showing a sample report control information table;

BEST MODE FOR CARRYING OUT THE INVENTION

Preferred embodiments of the present invention will now be described in detail in accordance with the accompanying drawings.

The situation monitoring device according to the present invention recognizes predetermined situations of predetermined target objects in response to the installation environment of such device and notifies the user of a change in situation through a network.

First Embodiment

Figure 2:
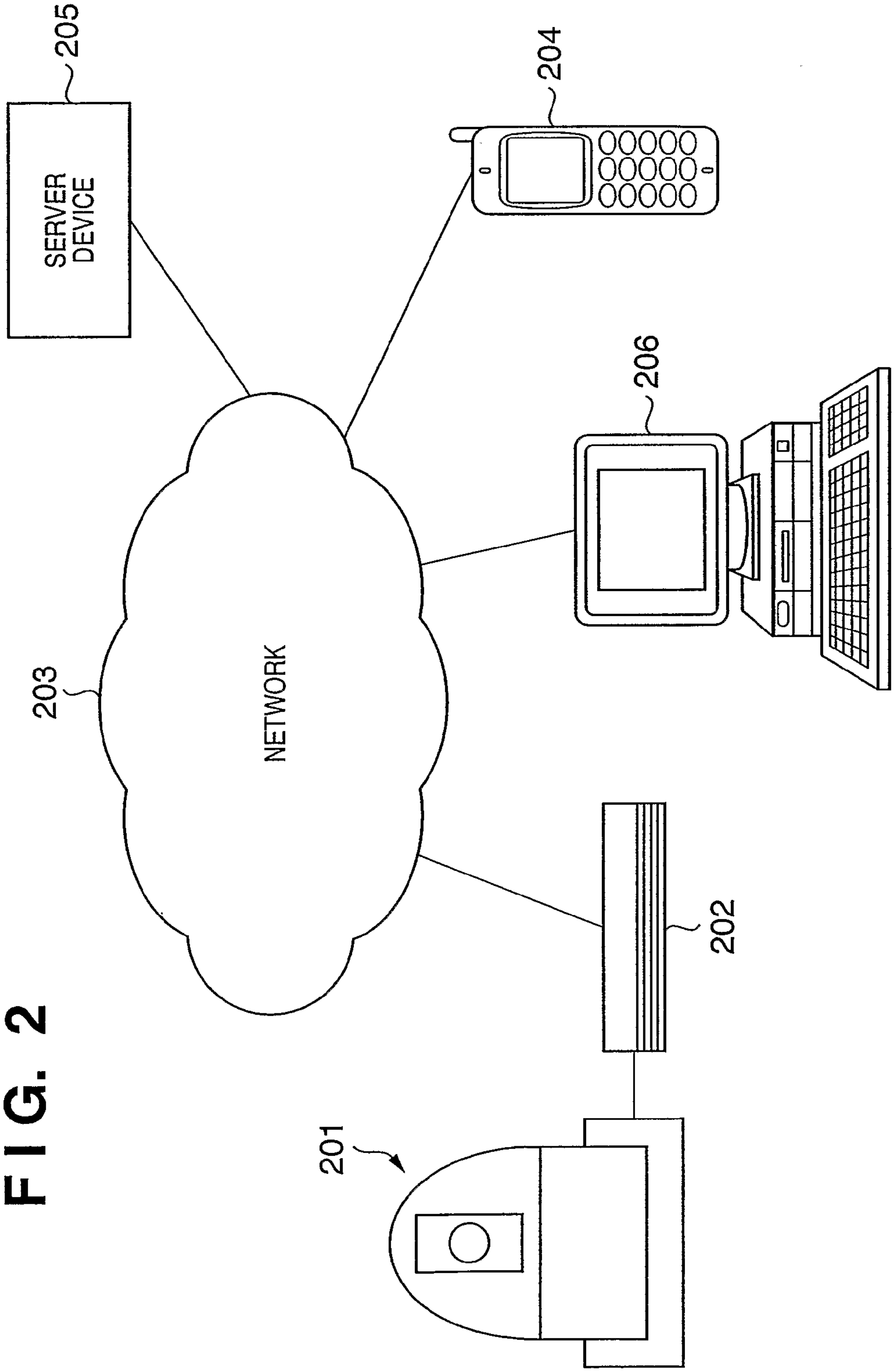
FIG. 2 is a diagram showing the outlines of the structure of a situation monitoring system including the situation monitoring device according to the first embodiment of the present invention.

FIG. 2 is a diagram showing the outlines of the structure of a situation monitoring system, including the situation monitoring device according to the first embodiment of the present invention.

In FIG. 2, reference numeral 201 designates a situation monitoring device, connected to a network 203 such as the internet by a line connection device such as a cable modem/ADSL modem 202. Reference numeral 204 designates a portable terminal device such as a portable telephone, which receives situation recognitions results information that the situation monitoring device 201 transmits. Reference numeral 205 designates a server device having the ability to provide services such as a mail server.

The situation monitoring device 201 generates a text document showing previously decided, predetermined information when predetermined changes in situation happen to a target object to be recognized (object of recognition) and transmits such information to the mail server 205 as an e-mail document in accordance with an internet protocol. The mail server 205, having received the e-mail document, notifies the portable terminal device 204 that is the recipient of the e-mail transmission in a predetermined protocol that e-mail has arrived. The portable terminal device 204 then accepts the e-mail document held in the mail server 205 according to the e-mail arrival information. Thus, a user in possession of the portable terminal device 204 can confirm a change in situation of an object of recognition that the situation monitoring device 201 detects from a remote location. It should be noted that the situation monitoring device 201 may be configured so as to have a built-in ability to access the network 203 directly, in which case the situation monitoring device 201 is connected to the network 203 without going through the in-house line connection device 202. In addition, the terminal that receives the situation recognition result information is not limited to the portable terminal device 204, and may be a personal computer or a PDA (Personal Digital Assistance), etc.

Figure 3:
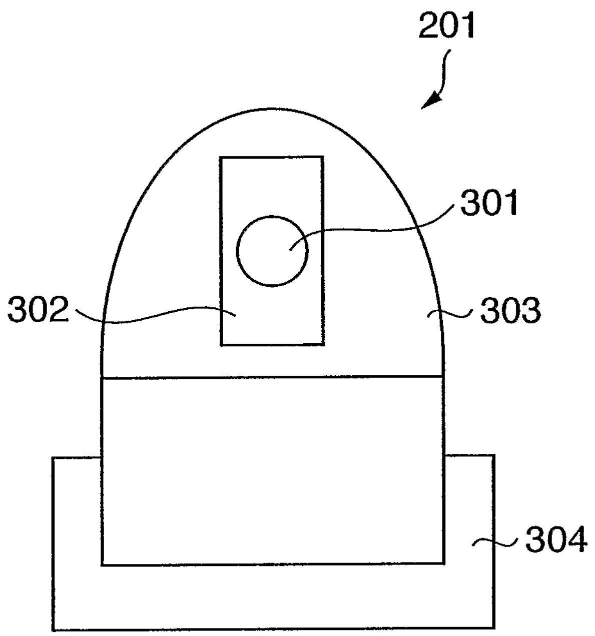
FIG. 3 is a diagram schematically showing the structure of the situation monitoring device according to the first embodiment of the present invention.

FIG. 3 is a diagram showing the outlines of the structure of the situation monitoring device 201 of the first embodiment. In FIG. 3, reference numeral 301 designates a camera lens that tilts (moves up and down) within a frame designated by reference numeral 302. Reference numeral 303 designates the outer frame for a pan movement. The lens 301 pans (moves left and right) together with such outer frame. Reference numeral 304 designates a stand, which contains important units other than the camera, including the power supply and so forth built in. Consequently, the situation monitoring device 201 can be made compact and lightweight, and moreover, by having a camera that can tilt/pan built in, can be easily installed in a variety of different locations.

The user then installs the situation monitoring device 201 in any location that suits the purpose and monitors the situation of a given target object.

Specifically, the situation monitoring device 201 can be used in a variety of cases, such as the following:

Placed near infants to confirm their safety.

Placed near sick persons to confirm their health.

Placed near the elderly to confirm their safety.

Placed at the entrance of a home to confirm the coming and going of family members and to monitor the intrusion of suspicious persons.

Placed near windows to monitor the intrusion of suspicious persons.

Placed in the bath to confirm the safety of occupants.

The foregoing is a summary description of the situation monitoring device according to the present embodiment and its common uses. Hereinafter, a detailed description is given of the processing performed by such situation monitoring device, with reference to the drawings.

Figure 4:
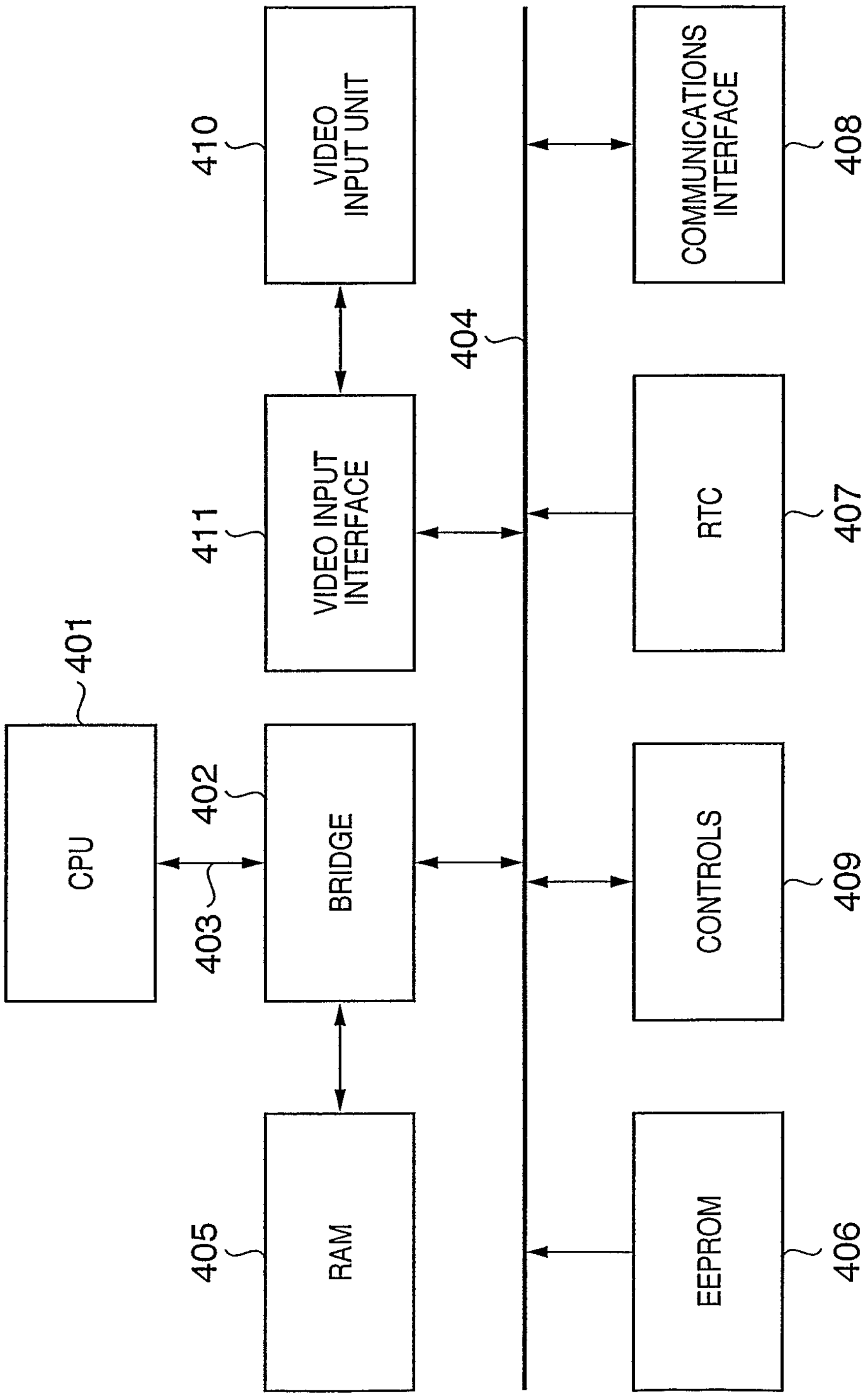
FIG. 4 is a diagram showing the hardware configuration of the situation monitoring device according to the first embodiment of the present invention.

FIG. 4 is a diagram showing the hardware configuration of the situation monitoring device according to the first embodiment of the present invention. In FIG. 4, reference numeral 401 designates a CPU (Central Processing Unit), 402 designates a bridge, which has the capability to bridge a high-speed CPU bus 403 and a low-speed system bus 404. In addition, the bridge 402 has a built-in memory controller function, and the capability to control access to a RAM (Random Access Memory) 405 connected to the bridge.

A RAM 405 is composed of large-capacity, high-speed memories necessary for the operation of the CPU 401, such as SDRAM (Synchronous DRAM)/DDR (Double Data Rate SDRAM)/RDRAM (Rambus DRAM). In addition, the RAM 405 is also used as an image data buffer. Furthermore, the bridge 402 has a built-in DMAC (Direct Memory Access Controller) function that controls data transfer between devices connected to the system bus 404 and the RAM 405. An EEPROM (Electrically Erasable Programmable Read-Only Memory) 406 stores a variety of setting data and instruction data necessary for the operation of the CPU 401. It should be noted that the instruction data is transferred to the RAM 405 during initialization of the CPU 401, and thereafter the CPU 401 proceeds with processing according to the instruction data in the RAM 405.

Reference numeral 407 designates a RTC (Real Time Clock) IC, which is a specialized device for carrying out time management/calendar management. A communications interface 408 is a processor that is necessary to connect the in-house line connection device (a variety of modems and routers) and the situation monitoring device 201 of the present embodiment, and may for example be a processor for processing a wireless LAN (IEEE802.11b/IEEE802.11a/IEEE802.11g and the like) physical layer and lower layer protocol. The situation monitoring device 201 of the present embodiment is connected to the external network 203 through the communications interface 408 and the line connection device 202. Reference numeral 409 designates controls, and is a processor that controls a user interface between the device and the user. The controls 409 are incorporated into a rear surface or the like of the device stand 304.

Figure 5:
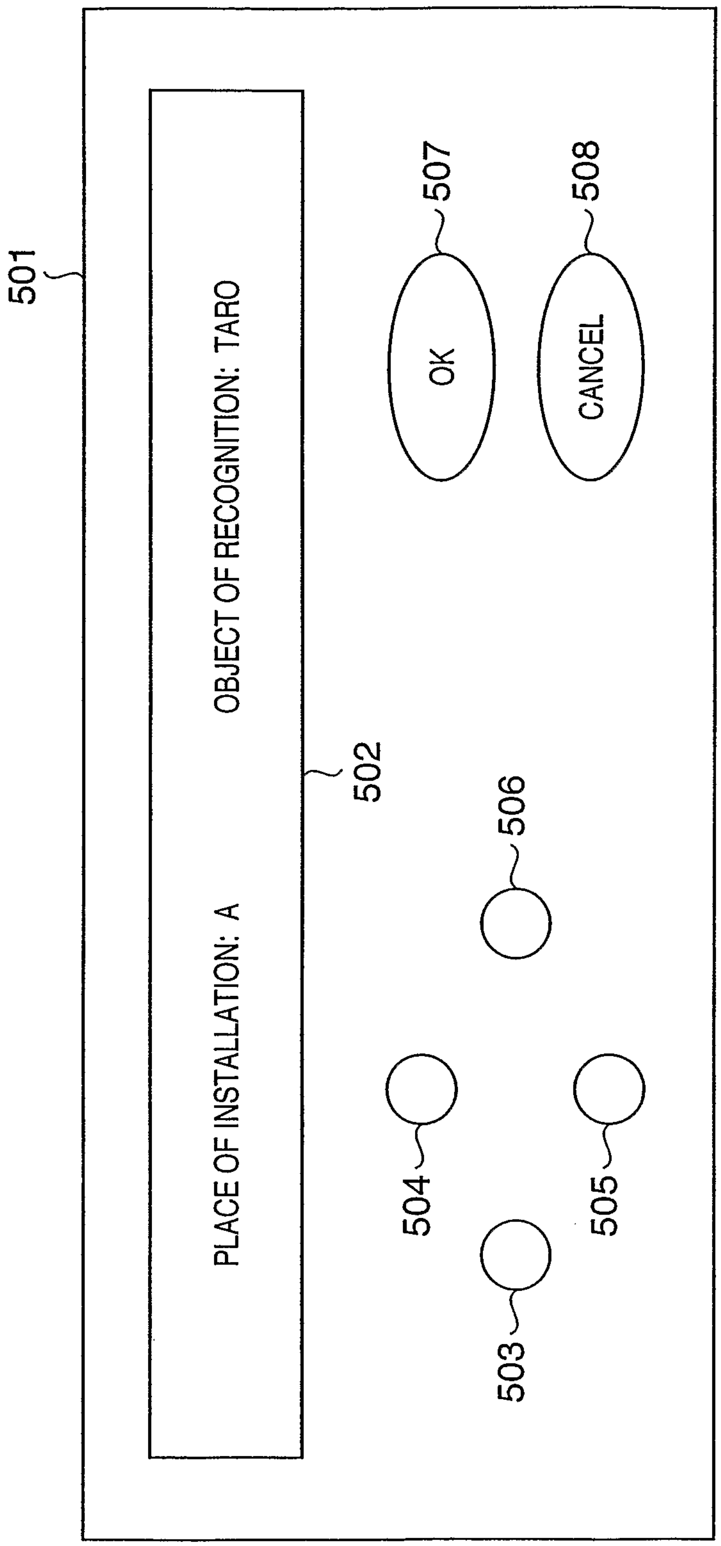
FIG. 5 is a diagram showing a control panel of the controls shown in FIG. 4.

FIG. 5 is a diagram showing a control panel of the controls 409 shown in FIG. 4. Reference numeral 502 designates a LCD that displays messages to the user. Reference numerals 503-506 designate buttons for menu choices, and are used to manipulate the menus displayed on the LCD 502. Reference numeral 507, 508 designate an OK button and a Cancel button, respectively. The user sets the situation to be recognized using the control panel 501.

In addition, reference numeral 410 shown in FIG. 4 designates a video input unit, and includes photoelectric conversion devices such as CCD (Charge-Coupled Devices)/CMOS (Complimentary Metal Oxide Semiconductor) sensors as well as the driver circuitry to control such devices, the signal processing circuitry to control a variety of image corrections, and the electrical and mechanical structures for implementing pan/tilt mechanisms. Reference numeral 411 designates a video input interface, which converts raster image data output from the video input unit 410 together with sync signals into digital image data and buffers it. In addition, the video input interface 411 generates signals for controlling the video input unit 410 pan/tilt mechanism.

The digital image data buffered by the video input interface 411 is forwarded to a specific address in the RAM 405 using, for example, the DMAC built into the bridge 402. Such DMA transfer is, for example, activated using the video signal vertical sync signal as a trigger. The CPU 401 then commences processing the image data held in the RAM 405 based on a DMA transfer-completed interrupt signal that the bridge 402 generates. It should be noted that the situation monitoring device 201 also has a power supply, not shown. This power supply may, for example, be supplied by a rechargeable secondary battery, or, where the communications interface 408 is a wire LAN, by Power Over Ethernet (registered trademark).

Figure 1:
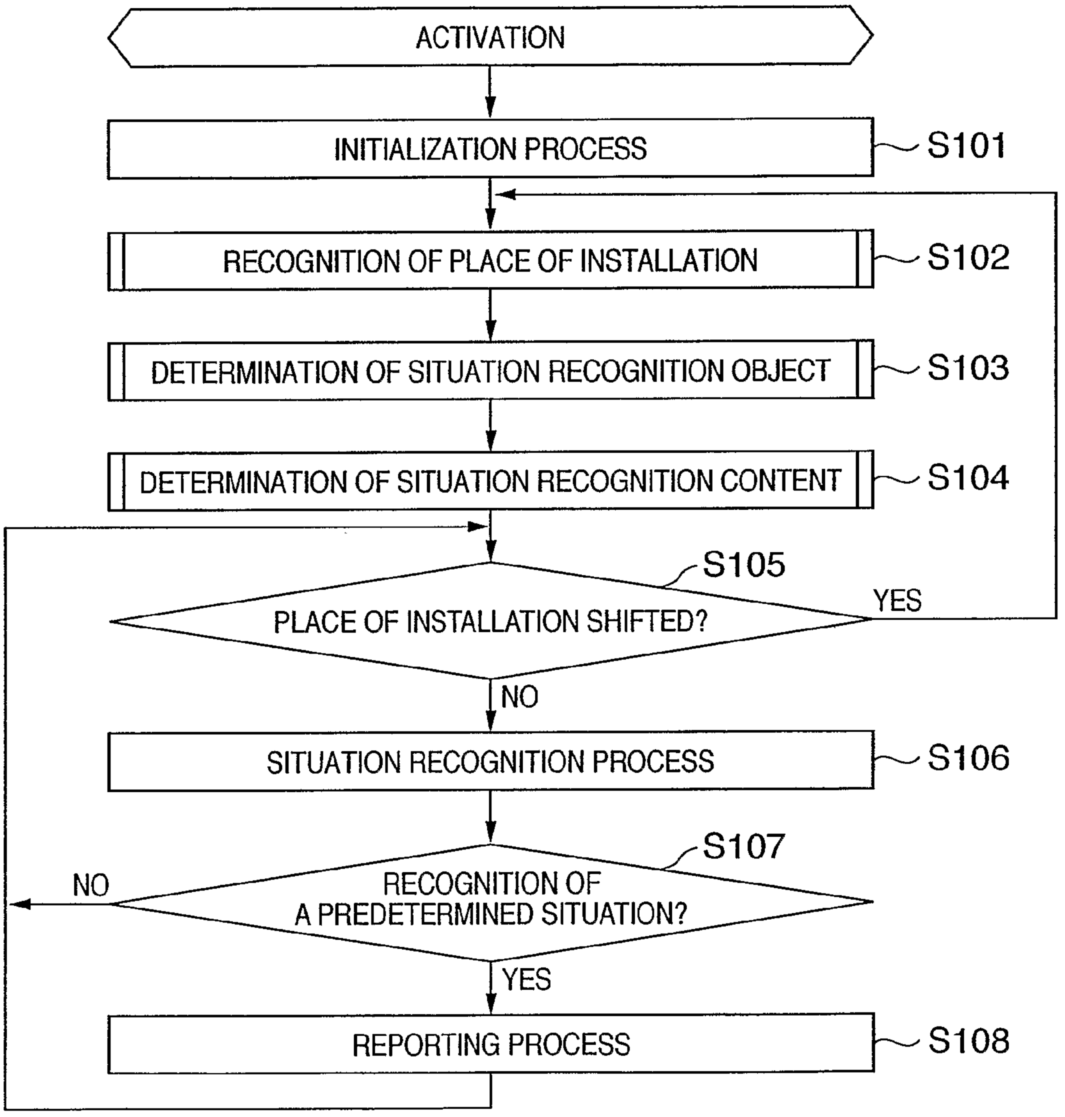
FIG. 1 is a flow chart illustrating the flow of processing performed by a situation monitoring device according to a first embodiment of the present invention.

FIG. 1 is a flow chart illustrating the flow of processing of the situation monitoring device 201 according to the first embodiment. This flow chart is a program loaded into the RAM 405 and processed by the CPU 401.

When the situation monitoring device 201 power supply is turned on, in step S101 a variety of initialization processes are carried out. Specifically described, in step S101, an instruction data load (that is, a transfer from the EEPROM 406 to the RAM 405), a variety of hardware initialization processes and processes for connecting to the network are executed.

Then, in step S102, a process of recognition of the place of installation of such situation monitoring device 201 is executed. In the present embodiment, the installation environment in which such device is installed is recognized using video image information input by the video input unit 410.

Figure 6:
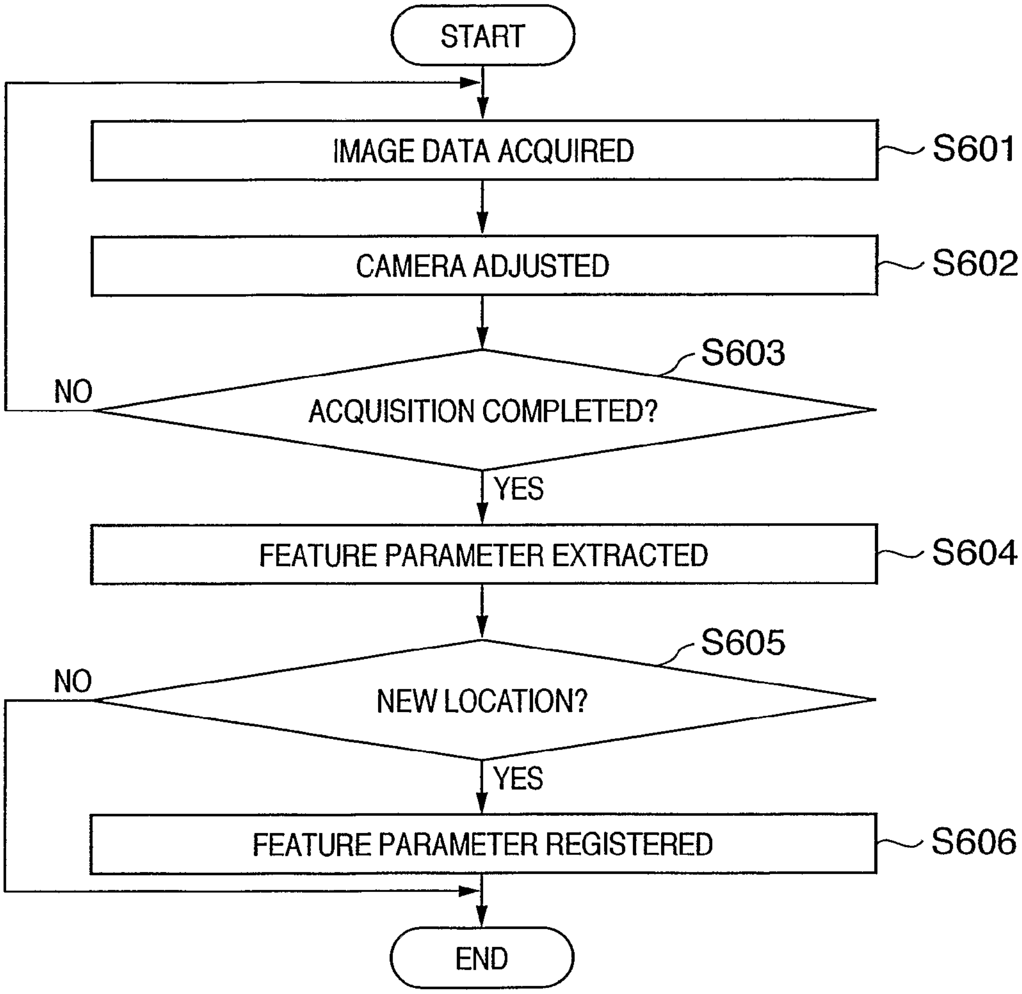
FIG. 6 is a flow chart illustrating details of step S102 shown in FIG. 1.
Figure 7:
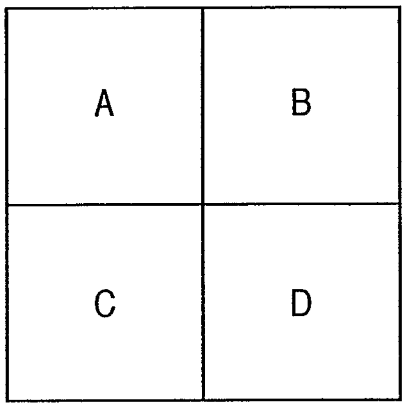
FIG. 7 is a diagram schematically showing image data obtained in step S602 shown in FIG. 6.

FIG. 6 is a flow chart illustrating details of step S102 shown in FIG. 1. First, in a step S601, video data is obtained from the video input unit 410 and held in the RAM 405. Next, in step S602, the video input interface 411 activates the video input unit 410 pan/tilt mechanism and obtains image data for areas outside the area obtained in step S601. FIG. 7 is a diagram showing schematically image data obtained in step S602 shown in FIG. 6. The interior of a room is sensed over a wide area with the camera image acquisition proceeding in the order of A->B->C->D.

Then, in step S603, it is determined whether or not the acquisition of image data in step S602 is completed. In step S603, if it is determined that the acquisition of image data is not completed, processing then returns to step S601. By contrast, if in step S603 it is determined that the acquisition of image data is completed, processing then proceeds to step S604.

Then, in step S604, a feature parameter extraction process is performed. It should be noted that it is possible to use a variety of techniques proposed by the image search algorithm and the like for the process of extracting a feature parameter. Here, for example, the position displacement feature extraction method of color histograms, higher-order local autocorrelation features (Nobuyuki Otsu, Takio Kurita, Sekita Iwao: "Pattern Recognition", Asakura Shoten, pp. 165-181 (1996)) or the like is adopted. Specifically, feature parameters that use a predetermined range of color histogram values and local auto-correlation features as features are extracted. Moreover, not only these types of primitive features may be used but also higher-level feature extraction methods may be used as well. For example, a technique may be used in which a search is made for particular objects such as a window, bed, chair or desk (K Yanai, K. Deguchi: "Recognition of Indoor Images Using Support Relations between Objects", Transactions of the Institute of Electronics, Information and Communication Engineers, vol. J84-DII, no. 8, pp. 1741/1752 (August 2001)) and the detailed features of those objects (their shape, color, etc.) and the special relations between the objects are extracted as feature parameters. Specifically, feature parameters that use the presence/position/size/color of the object as features are extracted. It should be noted that, in any case, the feature parameters are extracted from the image data held in the RAM 405.

Then, in step S605, a process of discrimination is carried out using the feature parameters obtained in step S604 and feature parameters corresponding to locations already recorded, and a determination is made as to whether or not the installation environment is a new location in which the device has not been installed previously. This determination is carried out with reference to a table indicating the relation between feature parameters and place of installation. Specifically, where there exists in the table a place of installation having feature parameters in which the Euclidean distance is the closest and moreover exceeding a predetermined threshold, such place of installation is recognized as the location where the situation monitoring device 201 is placed. It should be noted that this determination method is not limited to discrimination by distance, and any of a variety of techniques conventionally proposed may be used.

In step S605, if it is determined that the installation environment is a new location where the device has not been installed previously, processing then proceeds to step S606. By contrast, if in step S605 it is determined that the installation environment is a location where the device has been installed previously, processing terminates.

Then, in step S606, location codes corresponding to the feature parameters are registered. FIG. 14 is a diagram showing a table indicating the correlation between location code and feature parameter.

The "location code" is a number that the device manages. When a new place is recognized, an arbitrary number not yet used is newly designated and used therefore. The "feature parameter" Pnm is scalar data indicating the feature level of a feature m at a location code n. In the case of a color histogram, for example, the Pnm corresponds to a normalized histogram value within a predetermined color range. It should be noted that, for example, this table is held in the EEPROM 406 or the like.

Thus, as described in the foregoing, in step S102, the device recognizes the place of installation from the image data and generates both a unique location code that identifies the place of installation and information that determines whether or not that location is a new location where the device is installed.

Figure 8:
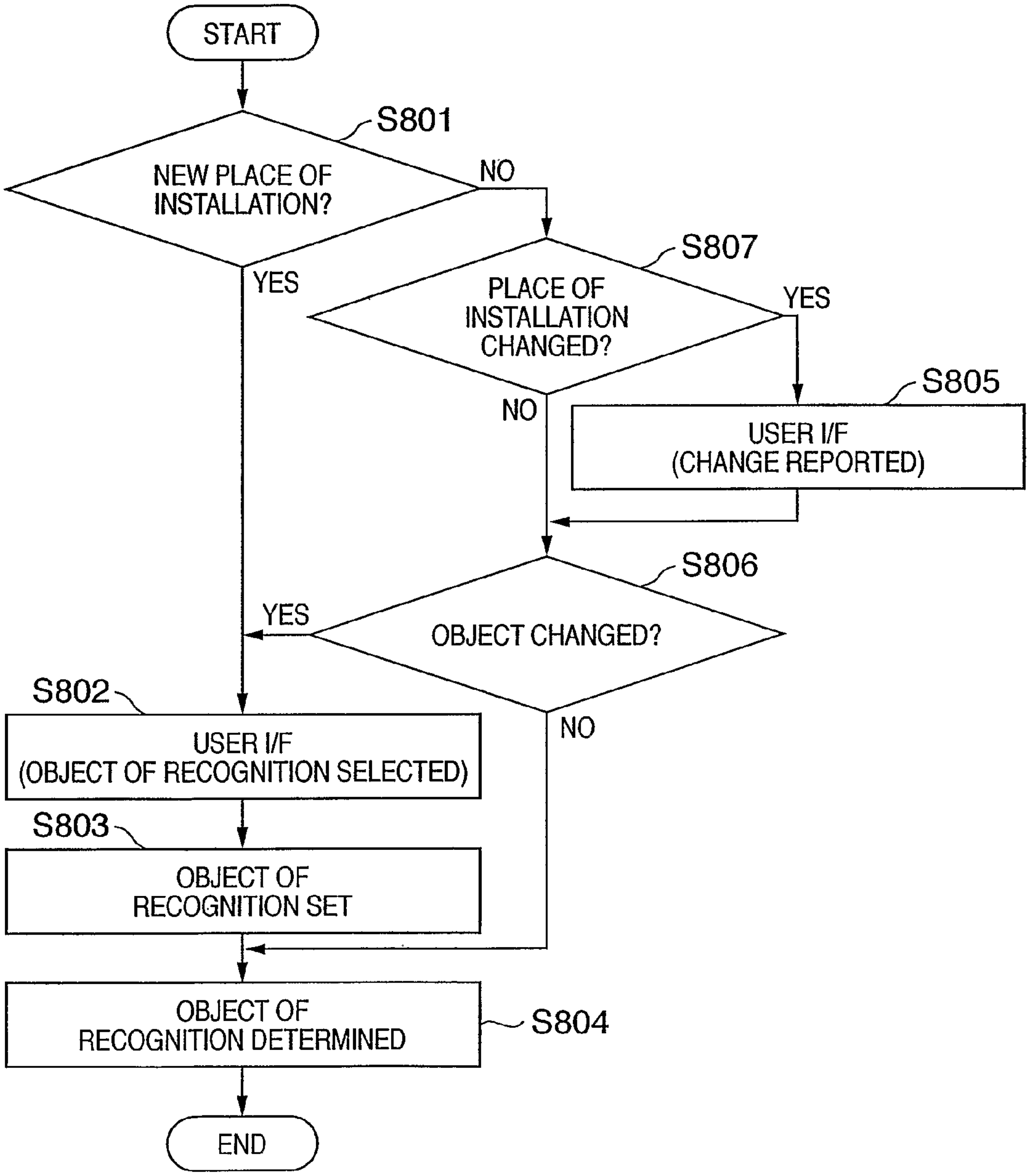
FIG. 8 is a flow chart illustrating details of step S103 shown in FIG. 1.

Then, in step S103 shown in FIG. 1, the situation to be recognized is determined. FIG. 8 is a flow chart illustrating details of step S103 shown in FIG. 1.

First, in step S801 in FIG. 8, using the results of the determination made in step S102, it is determined whether or not the location where the device is installed is a new location where the device has been installed for the first time. If the results of this determination indicate that the location is new, processing then proceeds to step S802 and the operation of setting the object of recognition commences. By contrast, if the results of the determination made in step S801 indicate that the location is not new, processing then proceeds to step S807.

Figure 9:
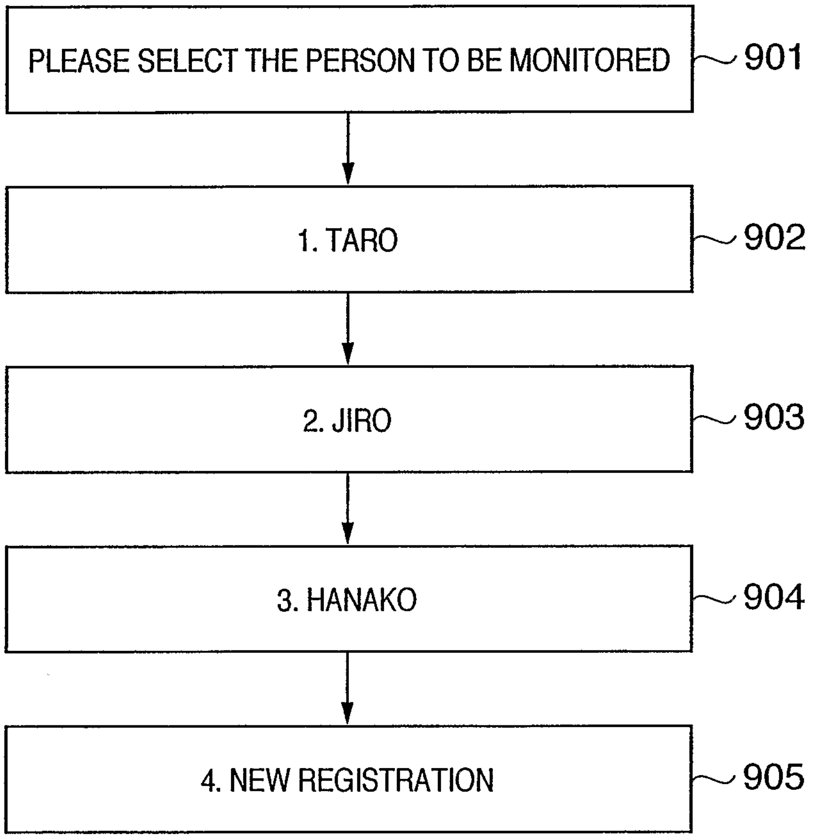
FIG. 9 is a diagram showing sample display contents displayed on an LCD of the controls.

In step S802, the user is prompted, through the controls 409, to set the object of recognition. FIG. 9 is a diagram showing sample display contents displayed on the LCD 502 of the controls 409. If it is determined that the location is new, then a message prompting the user to set the object of recognition as described in the foregoing is displayed on the LCD 502. When buttons 504-505 are pressed, previously registered persons are displayed in succession. When button 506 is pressed, the person currently displayed is set as the object of recognition.

When the selection of the person is completed and the OK button 507 is pressed, the person who is the object of recognition at the current place of installation is set in the table (FIG. 10). It should be noted that, if a person other than one previously registered is selected, then processing proceeds to registration of the person who is the object of recognition (905) from a new registration screen (not shown). In the registration process (905) shown in FIG. 9, video of the person to be registered is imaged and the feature parameters necessary to recognize such registered person is extracted from this video data. Furthermore, in the registration process (905), the user is prompted to enter attribute information for the registered person (such as name, etc.).

FIG. 10 is a diagram showing a sample recognition information table indicating the relation between the place of installation, the person who is the object of recognition and the contents of the situation to be recognized. The location code is a unique code assigned to the place recognized in the place of installation recognition process (step S102). The person code is a unique code assigned to a previously registered person. It should be noted that it is also possible to set a plurality of persons as objects of recognition for a given location (as in the case of location code P0002 shown in FIG. 10). In this case, an order of priority of the objects of recognition may be added to the recognition information table. If an order of priority is set, in the actual recognition process step the higher the priority of the person the more frequently he or she is recognized. Furthermore, sometimes a particular person who is an object of recognition is not set for a given location (as in the case of location code P0003 in FIG. 10).

Next, in step S803, the object of recognition is set. In addition, the device determines that there is no change if there is no input for a predetermined period of time, and in step S804 the actual object of recognition is determined. Then, in step S804, the recognition information table is checked and the person who is the object of recognition is determined. For example, if P002 is recognized as the location, then the device recognizes the situations of persons H0001 and H0002. It should be noted that, in the case of a location for which no particular person is registered as the object of recognition, the device recognizes the situations of all persons. For example, the device executes such recognition processes as detection of entry of all persons, or detection of all suspicious persons.

By contrast, in step S807, it is determined whether or not the place of installation has been changed. In step S807, if it is determined that the place of installation has been changed, processing then proceeds to step S805. By contrast, if in step S807 it is determined that the place of installation has not been changed, processing then proceeds to step S806.

Next, in step S805, through a predetermined user interface, the user is notified that there has been a change in the place of installation, and furthermore, the recognition information table is checked and the persons who are the objects of recognition for the place of installation are similarly reported to the user. Methods that notify and report to the user through a display on the LCD 502 of the controls 409 or through voice information generated by voice synthesis or the like may be used as the user interface that notifies and reports to the user. Such processes are carried out by the CPU 401.

Next, in step S806, a message concerning whether or not to change the contents of the setting is displayed for a predetermined period of time on the LCD 502 of the controls 409, during which time it is determined whether or not there has been an instruction from the user to change the target object. If the results of the determination carried out in step S806 indicate that there has been an instruction to change the target object, then processing proceeds to step S802 and the object of recognition is selected. By contrast, if the results of the determination carried out in step S806 indicate there has not been an instruction to change the target object, processing then proceeds to step S804. Then, after the object of recognition is determined in step S804 described above, processing terminates.

Figure 11:
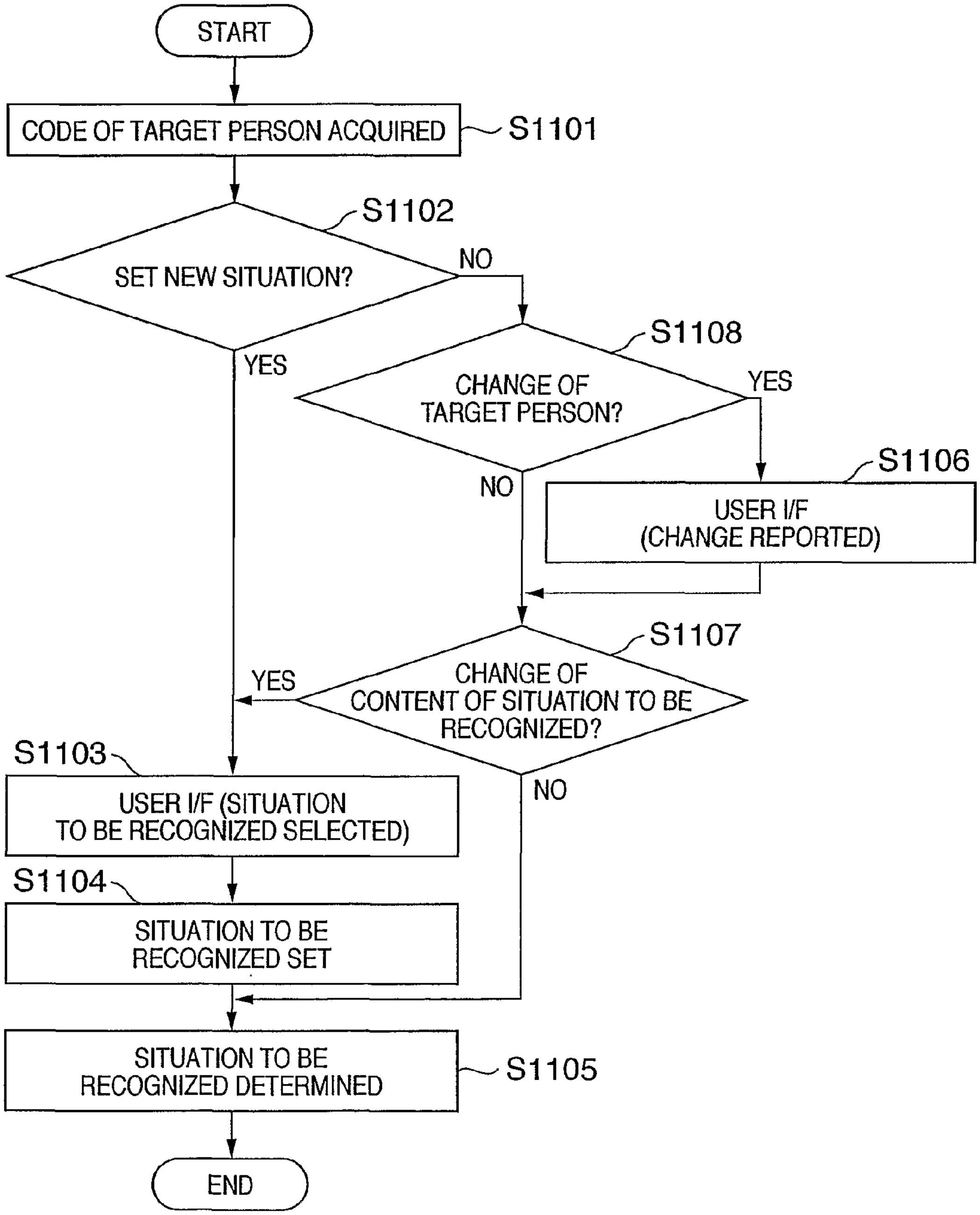
FIG. 11 is a flow chart illustrating details of step S104 step shown in FIG. 1.

Thus, as described in the foregoing, in step S102, the situation to be recognized is determined. Once again, a description is given of the process shown in FIG. 1. In step S104 in FIG. 1, the content of the situation to be recognized is determined. FIG. 11 is a flow chart illustrating details of step S104 shown in FIG. 1.

First, in step S1101, the recognition information table is checked and the person code of the person who is the object of recognition is acquired from the location code obtained in step S102. In the example shown in FIG. 10, when the location code P0002 is recognized, two persons, with person codes H0001 and H0002, are set as the persons who are objects of recognition.

Then, in step S1102, it is determined whether or not the content of the situation recognition at that location has already been set for these persons who are objects of recognition. If in step S1102 it is determined that the recognition situation at that location has not been set (as in the case of a new situation), processing then proceeds to step S1103 and selection of the content of the situation to be recognized is carried out.

Figure 12:
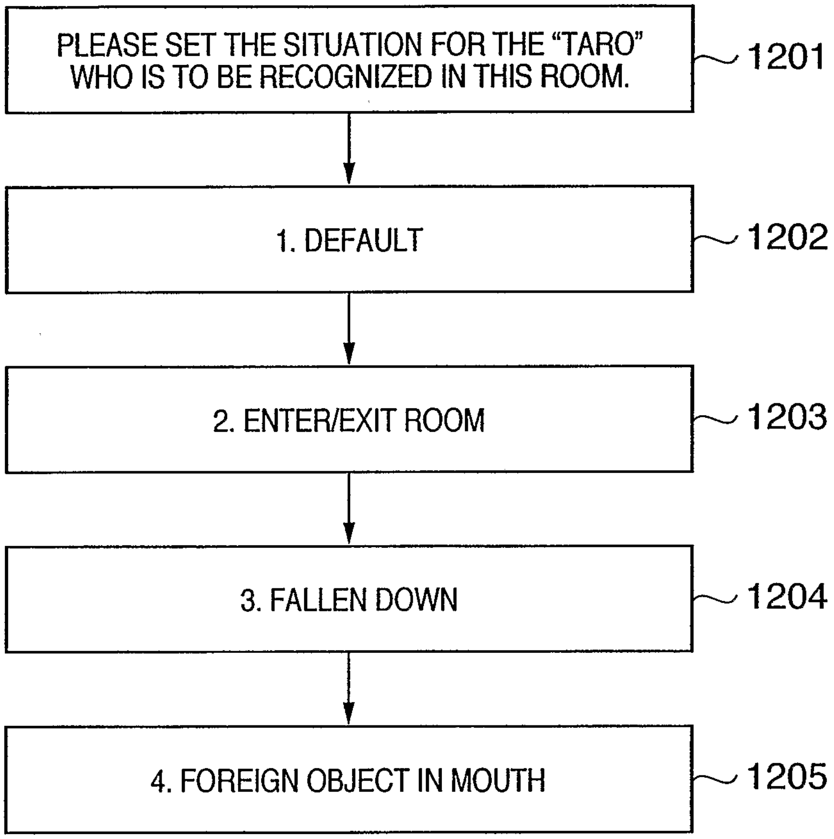
FIG. 12 is a diagram showing sample display contents displayed on the LCD of the controls in step S1103 shown in FIG. 11.

FIG. 12 is a diagram showing sample display contents displayed on the LCD 502 of the controls 409 in step S1103 shown in FIG. 11. First, a message prompting the user to select the content of the situation to be recognized for the designated person is displayed (1201). When buttons 504-505 are pressed, preset situation recognition contents are displayed in succession. When button 506 is pressed, the content currently displayed is set as the situation recognition content. When selection of the situation recognition content is completed and the OK button 507 is pressed, the situation recognition content for the person who is the object of recognition at the current place of installation is set in the recognition information table (step S1104). It should be noted that, if “default” (1202) is set or if there is no input from the user after a predetermined period of time has elapsed, then the content is automatically set to the default. The default is such that a situation ordinarily set in most cases, such as recognition of “room entry and exit” and the like, is automatically designated, thereby eliminating the inconvenience attendant upon setting.

By contrast, if the results of the determination carried out in step S1102 indicate that the content of the situation recognition at that location has already been set, then processing proceeds to step S1108 and it is determined whether or not there has been a change in the person who is the object of recognition. If the results of this determination indicate that there has been in a change in the person who is the object of recognition, processing then proceeds to step S1106. By contrast, if the results of the determination carried out in step S1108 indicate there has been no change in the person who is the object of recognition, processing then proceeds to step S1107.

Then, in step S1106, through a predetermined user interface, the user is notified that a new person who is the object of recognition has been set, and furthermore, the recognition information table is checked and the corresponding situation recognition content is similarly reported to the user. Methods that notify and report to the user through a display on the LCD 502 of the controls 409 or through voice information generated by voice synthesis or the like may be used as the user interface that notifies and reports to the user. Such processes are carried out by the CPU 401.

Then, in step S1107, a message concerning whether or not to change the contents of the setting is displayed for a predetermined period of time, during which time it is determined whether or not there has been an instruction from the user to change the target object. If the results of this determination indicate that there has been an instruction to change the target object, then processing proceeds to step S1103. By contrast, if the results of the determination carried out in step S1107 indicate that there has not been an instruction to change the target object, processing then proceeds to step S1105.

Then, in step S1103 and step S1104, a process of setting the situation recognition content is executed as with a new setting. If there is no user input after a predetermined period of time has elapsed, then the device determines that there has been no change in the contents and in step S1105 determines the content of the situation to be actually recognized. Then, in step S1105, the recognition information table is checked and the situation recognition content for the person who is the object of recognition is set.

Thus, as described in the foregoing, by the processes of from step S102 to step S104 shown in FIG. 1, the person who is the object of recognition and the situation recognition content are determined and the actual situation recognition process is executed in accordance with the determined conditions.

Next, in step S105, for example, a major change in the background area of the acquired image data is detected and it is determined whether or not the place of installation of the situation monitoring device has been moved. This change in the background area can be extracted easily and at low load using difference information between frames. If the results of the determination made in step S105 indicate that the place of installation has changed, then processing returns to step S102 and the place of installation recognition process is commenced one again. By contrast, if the results of the determination made in step S105 indicate that the place of installation has not changed, processing then proceeds to step S106. Matters are arranged so that this step S105 is executed only when necessary, and thus the processing load can be reduced.

Next, in step S106 shown in FIG. 1, the person decided upon in step S103 is tracked and a predetermined situation of such person is recognized. This tracking process is implemented by controlling the pan/tilt mechanism of the camera through the video input interface 409. In step S106, for example if P0002 is recognized as the location, the device executes recognition of the situation, "Have you fallen?" for the person who is the object of recognition H0001, and executes recognition of the situation, "Have you put something in your mouth?" for the person who is the object of recognition H0002. Here, any of the variety of techniques proposed conventionally can be adapted to that processing relating to recognition of the person which is necessary to this step (e.g., S. Akamatsu: "Research Trends in Face Recognition by Computer", Transactions of the Institute of Electronics, Information and Communication Engineers, vol. 80 No. 3, pp. 257-266 (March 1997)). The feature parameters needed to identify an individual are extracted during registration as described above.

In addition, any of the variety of methods proposed conventionally can be used for the situation recognition technique processed in step S106. For example, if detecting entry to and exit from a room of a particular person or detecting the entry into the room of a suspicious person, situation recognition can be easily achieved using the results of individual identification performed by a face recognition technique or the like. Moreover, many methods concerning such limited situations as feeling ill or having fallen have already been proposed (e.g., Japanese Laid-Open Patent Publication No. 11-214316 and Japanese Laid-Open Patent Publication No. 2001-307246).

In addition, a situation in which an infant has put a foreign object into his or her mouth also can be recognized from recognition of hand movements proposed in conventional sign language recognition and the like and from information concerning the position of the mouth obtained by detection of the face. The software that executes the algorithms relating to this process of recognition is stored in the EEPROM 406 or the server device 205 on the network, and is loaded into the RAM 405 prior to commencing the recognition process (step S106).

Figure 13:
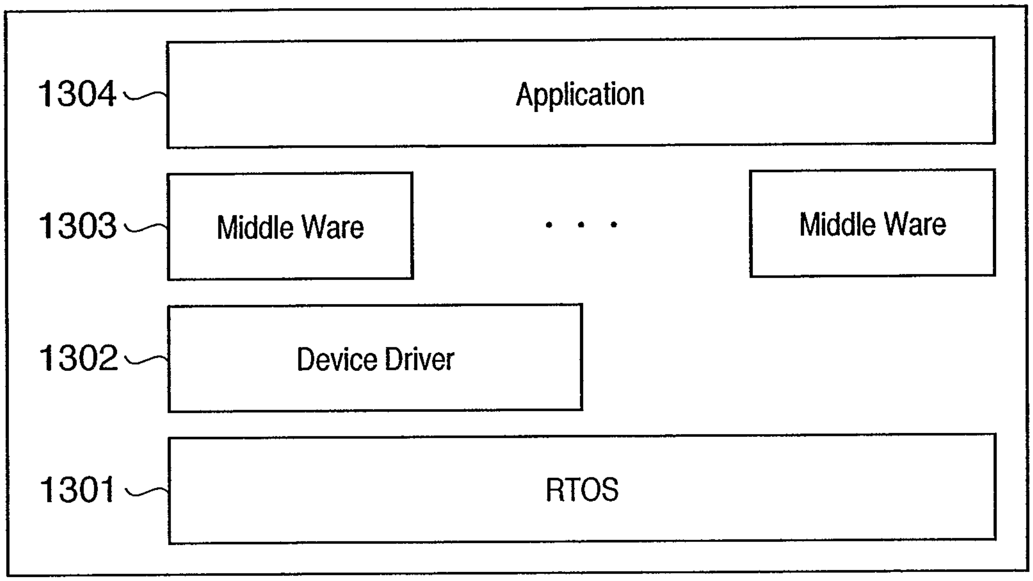
FIG. 13 is a diagram showing the layered structure of the software for the situation monitoring device.

The software for the situation monitoring device 201 according to the present embodiment has, for example, a layered structure like that shown in FIG. 13. Reference numeral 1301 designates an RTOS (Real Time Operating System), which processes task management, scheduling and so forth. Reference numeral 1302 designates a device driver, which, for example, processes device control of the video input interface 411 or the like. Reference numeral 1303 designates middle ware, and processes signals and communications protocols relating to the processes performed by the present embodiment. Reference numeral 1304 designates application software. The software necessary for the situation recognition processes relating to the present embodiment is installed as the middle ware 1303. The software with the desired algorithm is dynamically loaded and unloaded as necessary by a loader program of the CPU 401.

Specifically, when the situation to be recognized is determined in step S1105, in the example described above two types of processing software models recognizing the situation "Has person fallen?" for person H0001 and the situation "Has person put something in your mouth?" for person H0002 are loaded from the EEPROM 406. By limiting the recognition situation by the device installation environment or the person who is the object of recognition, complication of the recognition process algorithm can be avoided and a practical system can be built inexpensively.

In addition, it is also possible to provide inexpensively a system with even greater expandability by storing this type of processing software on another server device connected to the network. In this case, when the content of the situation to be recognized is determined (step S1105), the CPU 401 accesses the prescribed server device and forwards the prescribed software modules from the server device to the RAM 406 using a communications protocol such as FTP (File Transfer Protocol) or HTTP (Hyper Text Transfer Protocol). In step S106 shown in FIG. 1, such software is used as situation recognition process software. By storing the processing software modules on the server device, the capacity of the EEPROM 406 can be reduced, and moreover, device function expansion (processing algorithm expansion) can be easily achieved.

Then, in step S107 shown in FIG. 1, a determination is made as to whether or not the predetermined situation had been recognized. If the results of this determination indicate that such a predetermined situation has been recognized, processing then proceeds to step S108 and the CPU 401 executes a reporting process. This reporting process may, for example, be transmitted as character information through the communications interface 408 according to e-mail, instant messaging or some other protocol. At this time, in addition to character information, visual information may be forwarded as well. In addition, the device may be configured so that, if the user is in the same house where the device is installed, the user may be notified of the occurrence of an emergency through an audio interface, not shown.

By contrast, if the results of the determination made in step S107 indicate that the predetermined situation has not been recognized, then processing returns to step S105 and a check is made to determine the possibility that the place of installation has been moved. If the place of installation has not changed, the situation recognition process (step S106) continues.

Thus, as described above, in the present embodiment, in accordance with the results of the recognition of the place of installation the situation monitoring device, the situation to be recognized and the person who is to be the object of recognition are determined automatically, and furthermore, the appropriate recognition situation is set automatically in accordance with the results of the recognition of the person who is the object of recognition. Consequently, it becomes possible to implement an inexpensive situation monitoring device that uses few resources. In addition, merely by placing the device in an arbitrary location, a situation monitoring capability can be provided that is suitable for that location, and since a single device handles a variety of situations it is convenient and simple to use.

Second Embodiment

Figure 15A:
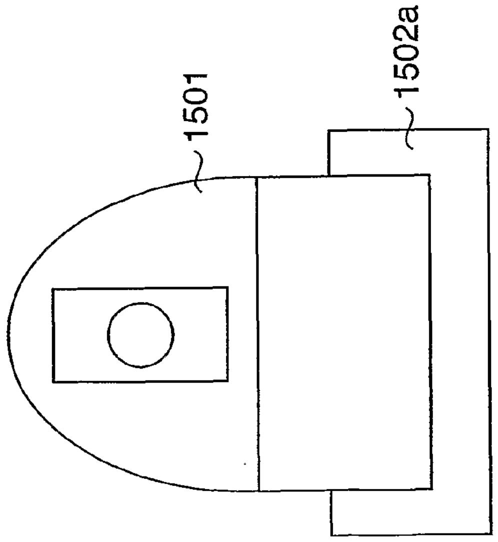
FIGS. 15A, 15B and 15C are diagrams schematically showing the structure of a situation monitoring device according to a second embodiment of the present invention.
Figure 15B:
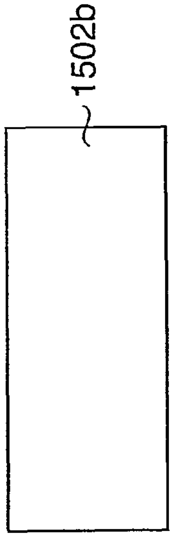
Figure 15C:
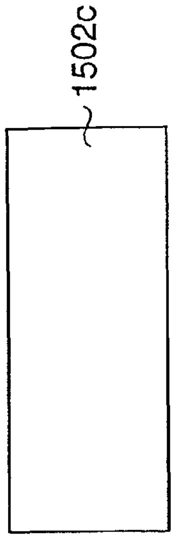

FIGS. 15A, 15B and 15C are diagrams schematically showing the structure of a situation monitoring device according to a second embodiment of the present invention. Reference numeral 1501 shown in FIG. 15A designates the main part of the situation monitoring device, containing the structure shown in the first embodiment. Reference numerals 1502*a*-1502*c* shown in FIGS. 15A-15C designate a stand called a cradle, with the main part set in the cradle. To the main part 1501 is attached an interface for supplying power from the cradle 1502 and an interface for inputting information. The cradle 1502 is equipped with a device that holds information for uniquely identifying the power supply and the cradle. An inexpensive information recording device such as a serial ROM can be used as that device, and can communicate with the main part 1501 through a serial interface.

The processing operation performed by the situation monitoring device of the second embodiment differs from the processing operation performed by the first embodiment only in the process of step S102 shown in FIG. 1.

Figure 16:
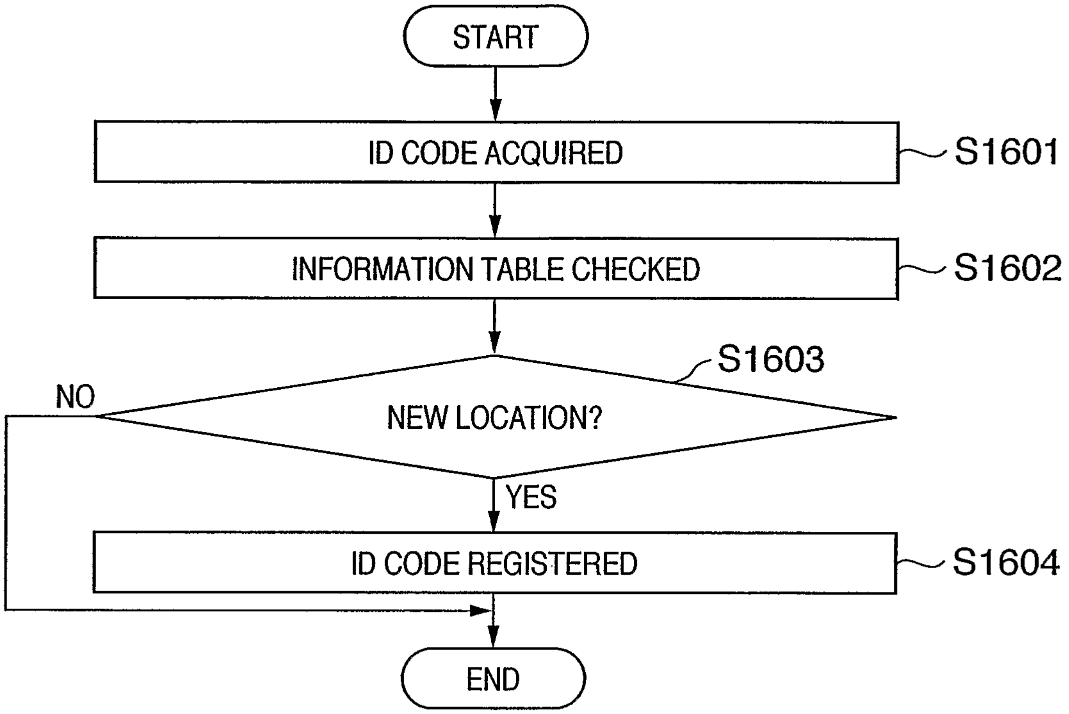
FIG. 16 is a flow chart illustrating the flow of processing performed by the situation monitoring device according to the second embodiment of the present invention.

FIG. 16 is a flow chart illustrating the flow of processing performed by the situation monitoring device according to the second embodiment.

First, in a step S1601, the CPU 401 accesses the serial ROM built into the cradle 1502 through a serial interface, not shown, and reads out ID data recorded on the ROM. Here, the read-out ID code is a unique code that specifies the place of installation. Then, in step S1602, a table that manages the ID code is checked.

Then, in step S1603, it is determined whether or not the place of installation of that ID code is a new location. It should be noted that the management table is assumed to be stored in the EEPROM 406. FIG. 17 is a diagram showing a sample management table, in which ID codes corresponding to arbitrary location codes that the situation monitoring device manages are recorded. If the results of the determination made in step S1603 indicate that the place of installation of the ID code is a new location, then processing proceeds to step S1604 and that ID code is recorded in the management table in the EEPROM 406. By contrast, if the results of the determination made in step S1603 indicate that the place of installation of the ID code is not a new location, processing then proceeds to step S1604.

In the case of the present embodiment, by setting the main part 1501 on the cradle 1502, the cradle so set is recognized, and consequently, the location where the device is installed is recognized. It should be noted that the processing steps that follow the place of installation recognition process (step S102) are the same as those of the first embodiment, with the object of recognition and the situation to be recognized determined according to the location.

In addition, in the case of the present embodiment, the user installs in advance cradles in a plurality of locations where the situation monitoring device is to be used and moves only the main part 1501 according to the purpose for which the device is to be used. For example, cradle 1502*a* is placed in the entrance hallway and cradle 1502*b* is placed in the children's room. Accordingly, if, for example, the main part 1501 is set on the cradle 1502*a*, the device operates in a situation recognition mode that monitors for entry by suspicious persons, and if set on the cradle 1502*b*, the device operates in a situation recognition mode that monitors the safety of the children.

As is clear from the foregoing description, according to the second embodiment, the place of installation can be recognized accurately by using a simple method in which the location is recognized by acquiring an ID code.

Third Embodiment

Figure 18:
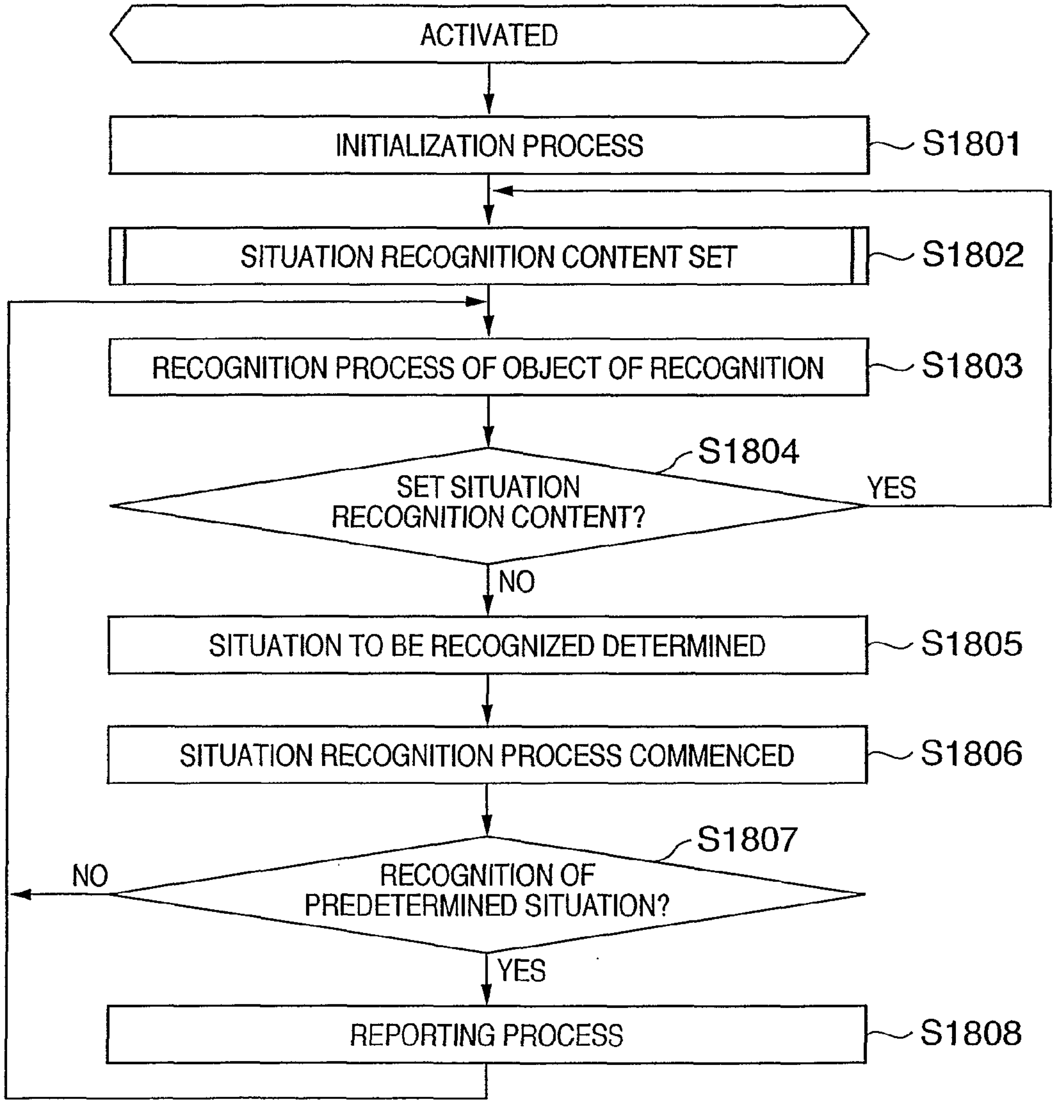
FIG. 18 is a flow chart illustrating the flow of processing performed by a situation monitoring device according to a third embodiment of the present invention.

FIG. 18 is a flow chart illustrating the flow of processing performed by a situation monitoring device according to a third embodiment of the present invention. The flow chart is a program loaded into the RAM 405, and processed by the CPU 401. In the case of the present embodiment as well, the hardware configuration is the same as that of the first embodiment of the present invention, and thus a description is given of only that which is different from the first embodiment.

When the power to the situation monitoring device is turned on, in step S1801 a variety of initialization processes are executed. Specifically, in step S1801, processes are executed for loading instruction data (forwarding data from the EEPROM 406 to the RAM 405), initialization of hardware, and network connection.

Figure 19:
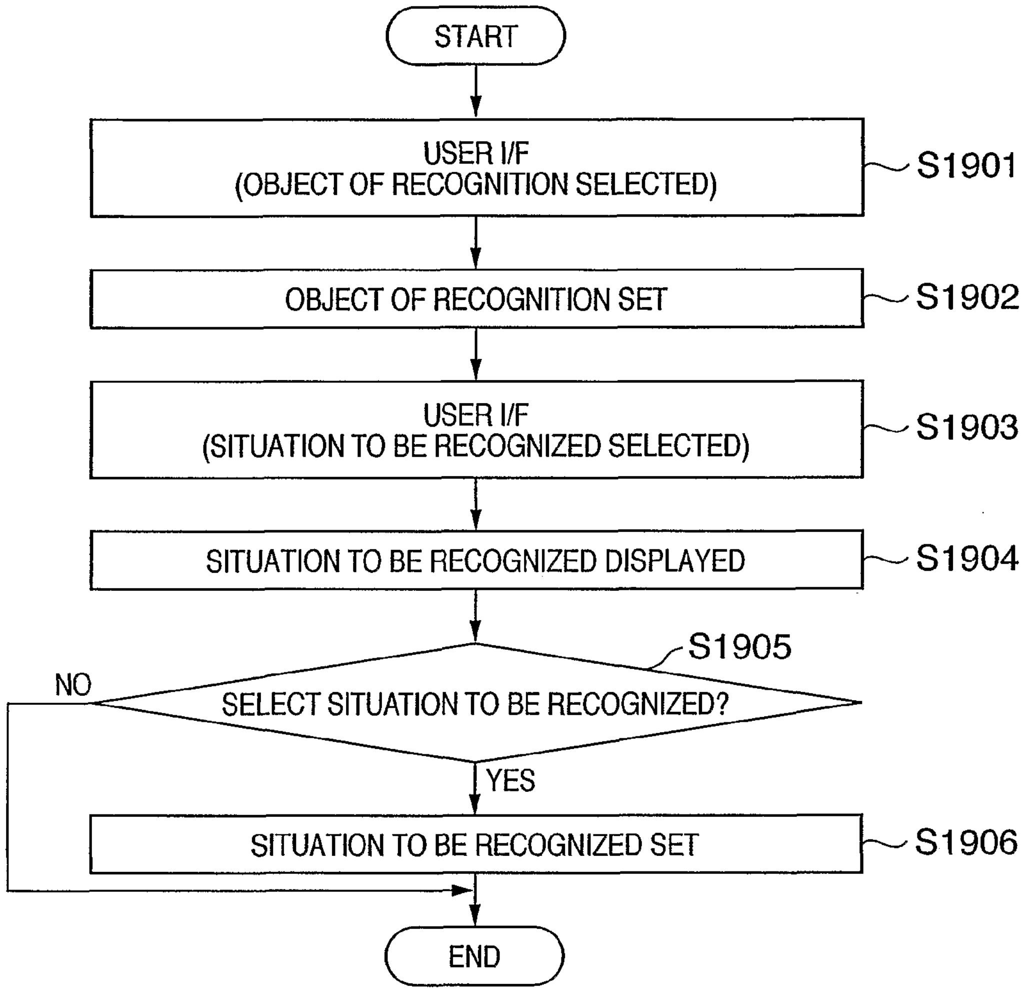
FIG. 19 is a flow chart illustrating details of step S1802 shown in FIG. 18.

Then, in step S1802, the content of the object of recognition and the situation to be recognized for that object of recognition are selected. FIG. 19 is a flow chart illustrating details of step S1802.

In step S1901, the user is prompted to set the object of recognition through the controls 409. FIG. 9 is a diagram showing sample display contents displayed on the LCD 502 of the controls 409. First, a message prompting the user to select an object of recognition is displayed (901). When buttons 504-505 are pressed, previously registered persons are displayed in succession. When button 506 is pressed, the person currently displayed is set as the object of recognition.

When the selection of the person is completed and the OK button 507 is pressed, the person who is to be the object of recognition at the current place of installation is recorded in the table (step S1902). It should be noted that, if a person other than one previously registered is selected, then, as with the first embodiment, the device enters a mode of registering the person who is to be the object of recognition from the new registration screen 905.

FIG. 20 is a diagram showing a sample recognition information table showing the relation between a person who is the object of recognition and a situation to be recognized.

The codes for the person who is the object of recognition are unique codes assigned to previously registered persons. In addition, codes having a special meaning can be assigned to the person who is the object of recognition. For example, in the example shown in FIG. 20, H9999 is a special code indicating that all persons are targeted. When such a code is selected, a predetermined situation is recognized for all persons.

Then, in a step S1903, the type of person selected as the object of recognition as well as the situation recognition content are reported to the user. Methods that notify and report to the user through a display on the LCD 502 of the controls 409 or through voice information generated by voice synthesis or the like may be used as the user interface that notifies and reports to the user.

In step S1905, a display querying the user whether or not the selected content of the situation recognition is to be changed is carried out for a predetermined period of time, and a determination is made as to whether or not there has been an instruction from the user to change the selected content of the situation recognition within the predetermined period of time. If the results of this determination indicate that there has been an instruction from the user to change the selected content of the situation recognition, processing then proceeds to step S1906. By contrast, if the results of that determination indicate that there has been no instruction from the user to change the selected content of the situation recognition, then processing terminates.

Then, in step S1906, the content of the situation to be recognized for each person who is the object of recognition is set. For example, when the buttons 504-505 are pressed, preset situation recognition contents are displayed in succession. When button 506 is pressed, the content currently displayed is set as the situation recognition content. When selection of the situation recognition content is completed and the OK button 507 is pressed, the situation recognition content for the person who is the object of recognition at the current place of installation is set in the recognition information table (step S1104). It should be noted that, if "default" (1202) is set or if there is no input from the user after a predetermined period of time has elapsed, then the content is automatically set to the default. The default is such that a situation ordinarily set in most cases, such as recognition of "room entry and exit" and the like, is automatically designated, thereby eliminating the inconvenience attendant upon setting.

When setting of the situation recognition content is completed, the actual recognition operation is commenced. First, in step S1803 shown in FIG. 18, the process of detecting and recognizing the object of recognition is carried out. Here, too, as described with respect to the first embodiment, any conventionally proposed person recognition algorithm or the like can be used for the process of recognizing the target object. It should be noted that if the person detected is a new person not set in the recognition information table, then the process of setting the person in the recognition information table is carried out in the setting step (S1802). However, in step S1804 the determination whether or not to move to the setting process can be set in advance by the user. That is, when a person not set in the table is detected, it is also possible to set the device to routinely ignore that person or carry out previously determined default situation recognition.

Then, in step S1805, the recognition information table is checked and the situation recognition content for the recognized person is determined. Then, in step S1806, the situation recognition process for the situation recognition content determined in step S1805 is executed. As with the first embodiment, the situation recognition performed here can also be accomplished using any of the variety of methods proposed conventionally. Then, in step S1807, when it is determined that a predetermined recognition of a predetermined person has been identified, as with the first embodiment, in step S1808, the user is notified.

Thus, as described above, with the third embodiment, the situation to be recognized is automatically determined for each person who is the object of recognition and an appropriate situation recognition is automatically set. Consequently, it is possible to implement an inexpensive system that uses few device resources. In addition, merely by placing the device in an arbitrary location, a situation monitoring capability can be provided that is suitable for that location, and since a single device handles a variety of situations it is convenient and simple to use.

It should be noted that, although the foregoing embodiments are described in terms of a person who is the object of recognition, the present invention is not limited to such a situation and may, for example, be adapted to any object of recognition, such as an animal or a particular object, etc. For example, in the case of a particular object, the device may be used to recognize and report such situations as that such object "has been moved from a predetermined position" or "has gone missing". Recognition of movement or presence can be accomplished easily by using a pattern matching technique proposed conventionally.

In addition, although the foregoing embodiments are described in terms of recognizing the location where the device is installed and the situation of the object of recognition target using video information, the present invention is not limited thereto and may, for example, be configured so as to recognize situation using sensing information other than video information. Furthermore, the present invention may use a combination of video information and other sensing information. Information gathered by voice, infrared, electromagnetic wave or other such sensing technologies can be used as the sensing information.

In addition, although the foregoing embodiments are described in terms of defining the relation between the place of installation, the object of recognition and the situation recognition content using an ordinary table, the present invention is not limited thereto and may, for example, make determinations using higher level recognition technologies. For example, a technique may be used in which high-level discrimination is carried out concerning the significance of a location (i.e., that the place is a child's room or a room in which a sick person is sleeping) from the recognition of particular objects present at the place of installation or the identification of persons appearing at such location, and using the results of such recognition and identification to determine the object of recognition and the situation recognition content.

In addition, although the first embodiment described above is described in terms of commencing the process of recognition of the place of installation of the device using a change in the acquired background, the present invention is not limited thereto and may, for example, use other techniques. For example, a method may be used in which a mechanical or an optical sensor is attached to the bottom of the device that detects when such device is picked up and later set down again, with location recognition commenced at such times. Moreover, a method may be used in which the process of recognizing the location is commenced when a predetermined button on the controls is set. In either case, the processing load can be reduced compared to executing the location recognition process continuously. Furthermore, a method like that in which the location recognition process is commenced automatically at predetermined time intervals using the RTC 407 may be used. In this case as well, the processing load can be reduced compared to executing the location recognition process continuously.

In addition, although the second embodiment described above is described in terms of recognizing the place of installation by the different cradles on which the situation monitoring device is set, the present invention is not limited thereto and may, for example, use other techniques. For example, the device may be given a built-in wireless tag receiver so that, for example, the place of installation of the device may be detected by detecting a wireless tag affixed at a predetermined location within the house. In this case, the wireless tag can be provided by a seal or the like, thus making it possible to implement, easily and inexpensively, a reliable place of installation detection capability. Furthermore, the device may be given a built-in, independent position information acquisition unit in the form of a GPS (Global Position System) or the like, and the information obtained by such unit used to acquire the position of the device inside the house, etc. In this case, by combining GPS position detection results and image detection results, it is possible to provide a more accurate place of installation recognition capability.

In addition, although the foregoing embodiments are described in terms of using internet e-mail as a medium of reporting a change in the situation of the object of recognition, it is conceivable that problems might occur with real-time transmission if e-mail protocols are used. Accordingly, other protocols may be used. For example, by using instant messaging protocol and the like, it is possible to achieve rapid information reporting. Moreover, the invention may be configured so that, instead of reporting by text message, the device main unit is provided with a built-in telephone capability and voice synthesis capability, so as to contact the remote location directly by telephone to report the information.

In addition, although the foregoing embodiments are described in terms of using a camera having a mechanical control structure (a so-called pan/tilt camera), the present invention is not limited thereto and may, for example, employ a wide-angle camera instead. In that case, the object of recognition is not supplemented mechanically but instead an equivalent process can be implemented using image data acquired at wide angles.

Figure 21:
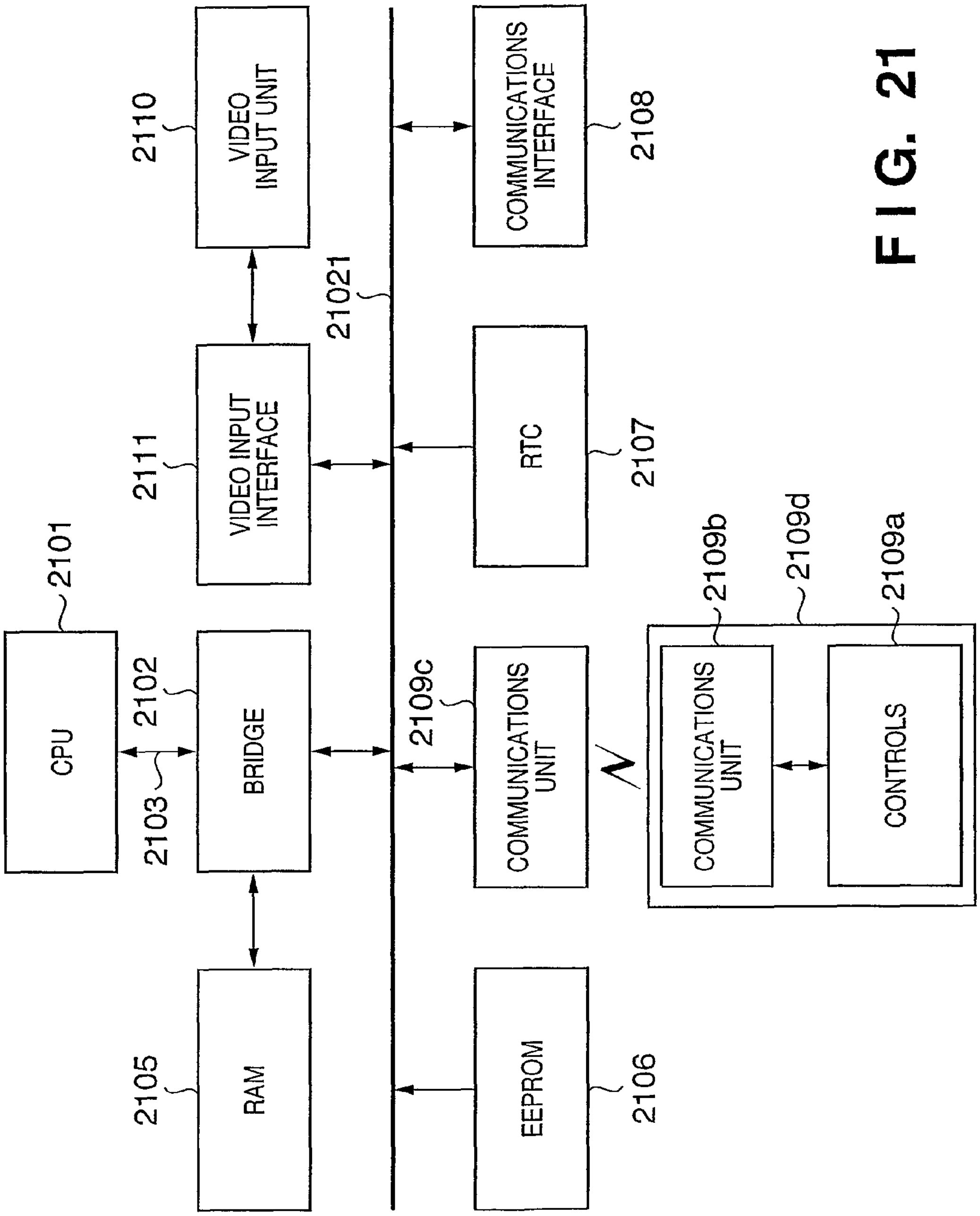
FIG. 21 is a diagram showing hardware configuration in a case in which a remote control serves as the controls.

In addition, although the foregoing embodiments are described in terms of providing the device main unit with a control unit having an input/output capability as the controls, the present invention is not limited thereto and may, for example, employ a remote control or the like that is separate from the device as the control unit. FIG. 21 is a diagram showing the hardware configuration in a case in which a remote control is used for the control unit. In FIG. 21, only the controls 2109 are different from the hardware configuration described with respect to the first embodiment above (FIG. 4). Thus, reference numerals 2109*b, c* designate communications units for controlling communications between the controls I/F 2109 and the main unit, implemented using a wireless interface such as an electromagnetic wave or infrared wireless interface. These communications units can be implemented easily and inexpensively using low-speed wireless transmission medium. Reference numeral 2109*a* designates the controls I/F, which is equipped with display/input functions like the controls 409 shown in the first embodiment. A remote control 2109*d*, consisting of the controls I/F 2109*a* and the communications unit 2109*b*, is lightweight and compact. The user can set parameters needed for the operation of the device by operating the remote control 2109*d*. Separating the controls from the main unit in the foregoing manner provides greater flexibility in the installation of the device and enhances its convenience as well.

Furthermore, the invention may be configured to set the parameters needed for operation using a network. For example, the invention may be provided with an HTTP (Hyper Text Transfer Protocol) server capability and the user provided with a Web-based user interface based on HTTP via a communications interface 2108. The HTTP server may be incorporated as one part of the middle ware (reference numeral 1303 shown in FIG. 13), activating a predetermined parameter setting program in response to input from the remote location based on HTTP. The user is able to set the parameters needed for operation of the main unit from an ordinary terminal such as a mobile telephone, a PDA, a personal computer or the like. Furthermore, such setting operation can be carried out from the remote location. Moreover, the device can be implemented inexpensively because it does not require provision of a special control unit.

In addition, although the foregoing embodiments are described in terms of executing all processes using a processor incorporated in and built into the situation monitoring device, the present invention is not limited thereto and may, for example, be implemented in combination with a personal computer or other such external processing device. In that case, only the reading in of image data is accomplished using a special device, with all other processing, such as image recognition, communications and so forth, accomplished using personal computer resources. By using a wireless interface such as BlueTooth, for example, or a power line communications interface such as HPA (Home Power Plug Alliance) or the like to connect the specialized device and the personal computer, the same convenience as described above can be achieved. This sort of functionally dispersed situation monitoring system can of course be achieved not only with the use of a personal computer but also with the aid of a variety of other internet appliances as well.

In addition, although the foregoing embodiments are described in terms of implementing the present invention by software processing using a CPU, the present invention is not limited thereto and may, for example, be implemented by special hardware processing as well. In that case, the algorithm for situation recognition corresponds to object data that determines the internal circuitry of an FPGA (Filed Programmable Gate Array) or object data that determines the internal circuitry of a reconfigurable processor. When the situation to be recognized is determined (step S1105), the system control processor loads the data from the EEPROM 406 or a server device connected to the network or the like into the special hardware. The special hardware then commences recognition processing of a predetermined algorithm according to the object data that has been loaded.

Thus, as described above, according to the present embodiments, because the content of the situation to be recognized is limited depending on the place of installation of the device itself, it is possible to achieve a reliable situation monitoring device inexpensively. Moreover, because the place of installation is diagnosed automatically and the appropriate situation to be recognized is determined accordingly, the user can recognize a variety of situations simply by installing a single device.

In addition, according to the above-described embodiments, because the object of recognition and the situation recognition content are limited according to the place of installation of the device, it is possible to achieve a more reliable situation monitoring device inexpensively. Moreover, because the place of installation is diagnosed automatically and the appropriate object of recognition and situation to be recognized are determined accordingly, the user can recognize a desired situation with a high degree of reliability simply by installing the device.

In addition, according to the above-described embodiments, because the situation recognition content is limited according to the object of recognition, it is possible to achieve a reliable situation monitoring device inexpensively. Moreover, the user can recognize a desired situation simply by placing the device near the target object of recognition or a location where there is a strong possibility that the target object of recognition will appear.

In addition, according to the above-described embodiments, the device can be implemented inexpensively without the need for special sensors and the like. Moreover, carrying out location recognition processing only where necessary enables the processing load to be reduced. As a result, location recognition processing can be commenced reliably with an even simpler method. Furthermore, location recognition processing can be commenced reliably without the addition of special sensors and the like.

Moreover, it is possible to prevent errors in the recognition function produced by erroneous recognition of the place of installation. It is also possible to prevent errors in the recognition function produced by erroneous recognition of the object of recognition. It is also possible to provide a user interface for setting information at the appropriate time, thus improving convenience.

In addition, according to the above-described embodiments, because it is possible to provide a user interface for setting information automatically when changing the place of installation, thus improving convenience. It is also possible to provide a user interface for setting information only when changing the place of installation, and even then only when necessary, thus improving convenience. It is also possible to provide a user interface for setting information only when necessary, depending on the results of the recognition of the object of recognition.

In addition, according to the above-described embodiments, providing a user interface for setting information only when necessary improves convenience and makes it possible to achieve more desirable situation recognition depending on the order of priority. It is also possible to recognize the place of installation of the device reliably using a simple method.

In addition, the above-described embodiments make it more convenient for the user to set the parameters necessary for operation of the device, and also enable the user to set the parameters necessary for the operation of the device from a remote location. It is also possible to set the parameters necessary for the operation of the device from an ordinary terminal. In addition, it is possible to achieve a more compatible device with greater expansion capability inexpensively.

Fourth Embodiment

Figure 22:
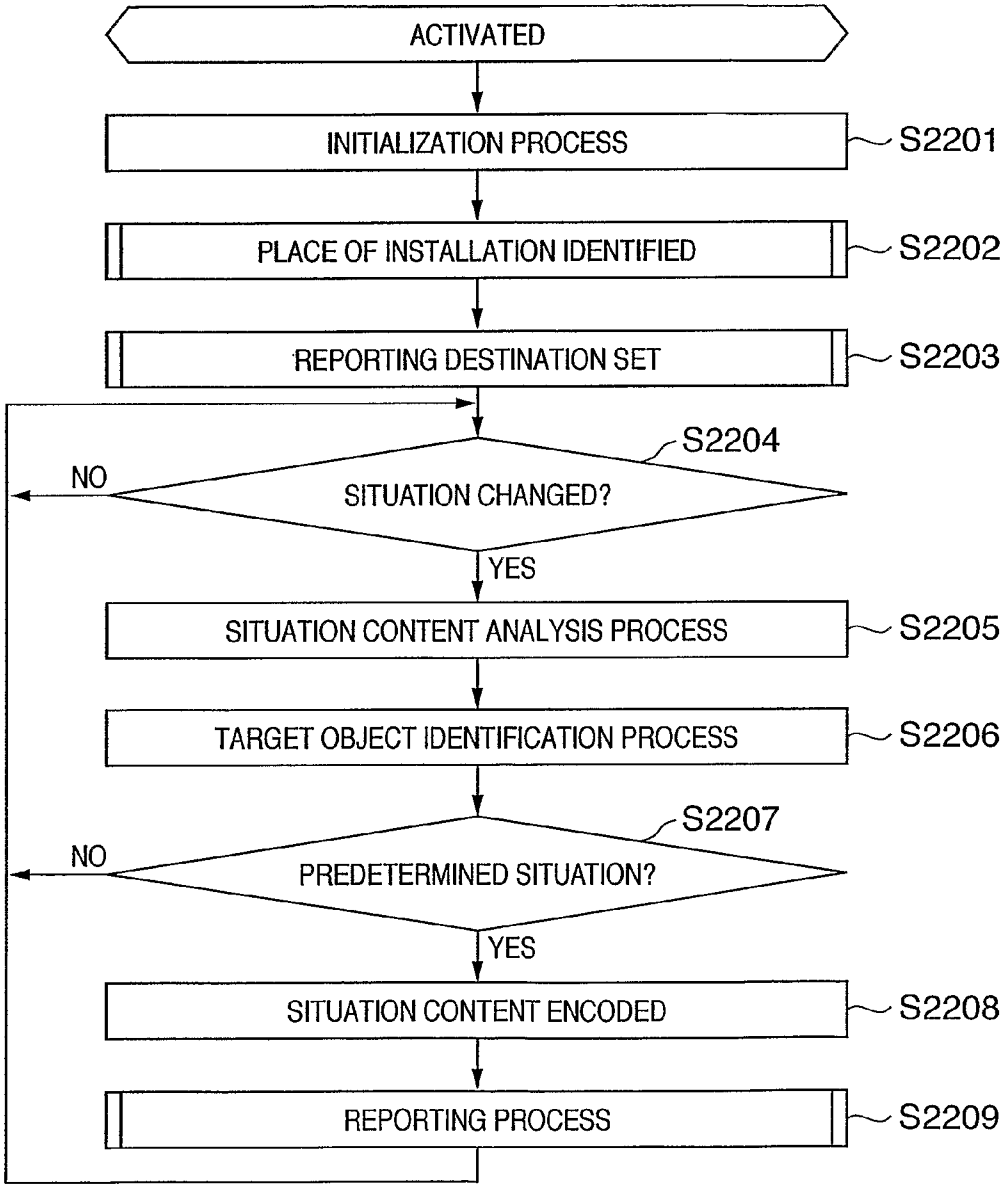
FIG. 22 is a flow chart illustrating the flow of processing of a situation monitoring device according to a third embodiment of the present invention.

FIG. 22 is a diagram showing the outlines of a processing flow performed by a situation monitoring device according to a fourth embodiment of the present invention. Such processing flow is a program loaded in the RAM 405 and processed by the CPU 401.

When the situation monitoring device 201 power supply is turned on, in step S2201 a variety of initialization processes are carried out. Specifically, instruction data load (that is, a transfer from the EEPROM 406 to the RAM 405), hardware initialization and connection to the network are executed.

Next, in a step S2202, a process of identifying the place of installation is executed. In the present embodiment, the place of installation of the device is identified using video image information input using the video input unit 410. It should be noted that the details of the place of installation identification process (step S2202) are the same as those described in FIG. 6 with respect to the first embodiment described above, and thus a description thereof is omitted here (the table indicating the relation between the location codes and the feature parameters are the same as in FIG. 14 (see FIG. 29)).

Alternatively, instead of performing the identification of the place of installation automatically, the device may be configured so that the user performs this task manually. In that case, the user inputs information designating the place of installation through an interface, not shown, displayed on the control panel 501 of the controls 409.

In addition, when selecting the destination for the reporting of the situation recognition content or the reporting medium, when not using information relating to the place of installation, the place of installation identification process (step S2202) or the place setting process may be eliminated.

Figure 24:
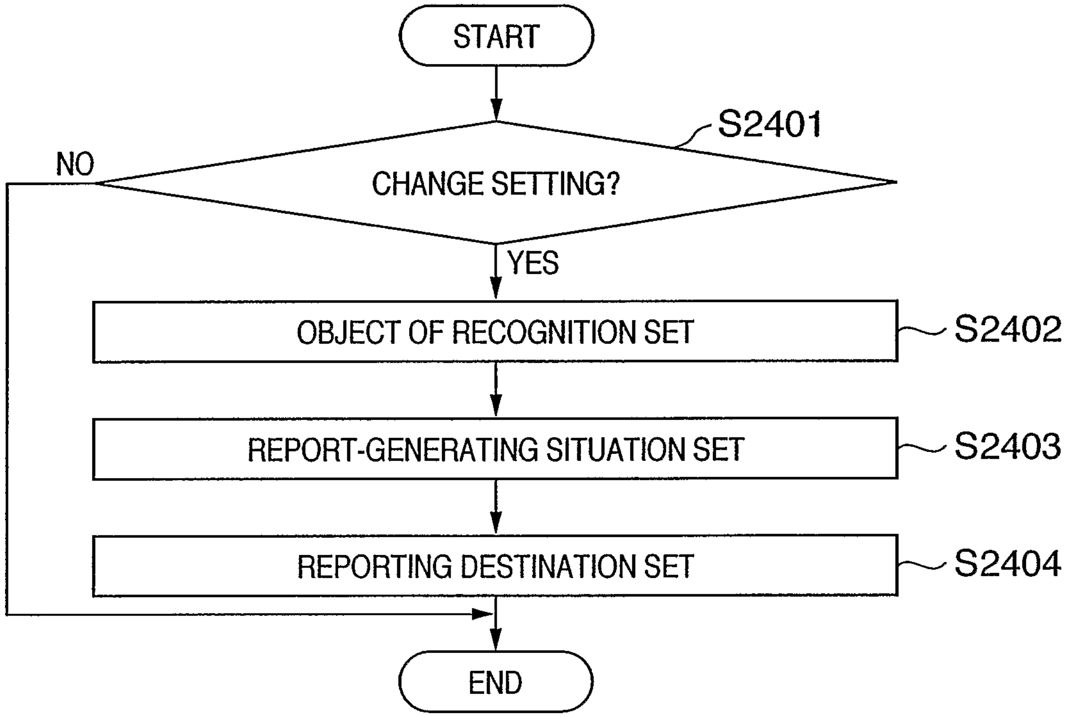
FIG. 24 is a flow chart illustrating details of a report destination setting process (step S2203)

Next, in step S2203, the destination of the reporting when a predetermined situation is recognized is set. FIG. 24 is a flow chart illustrating details of a report destination setting process (step S2203).

In step S2401, an interface, not shown, querying the user whether or not to change the settings is displayed on the control panel 501 of the controls 409. In the event that the user does change the settings, the setting information stipulating the reporting destination is updated in the steps (S2402-S2405) described below.

Figure 23:
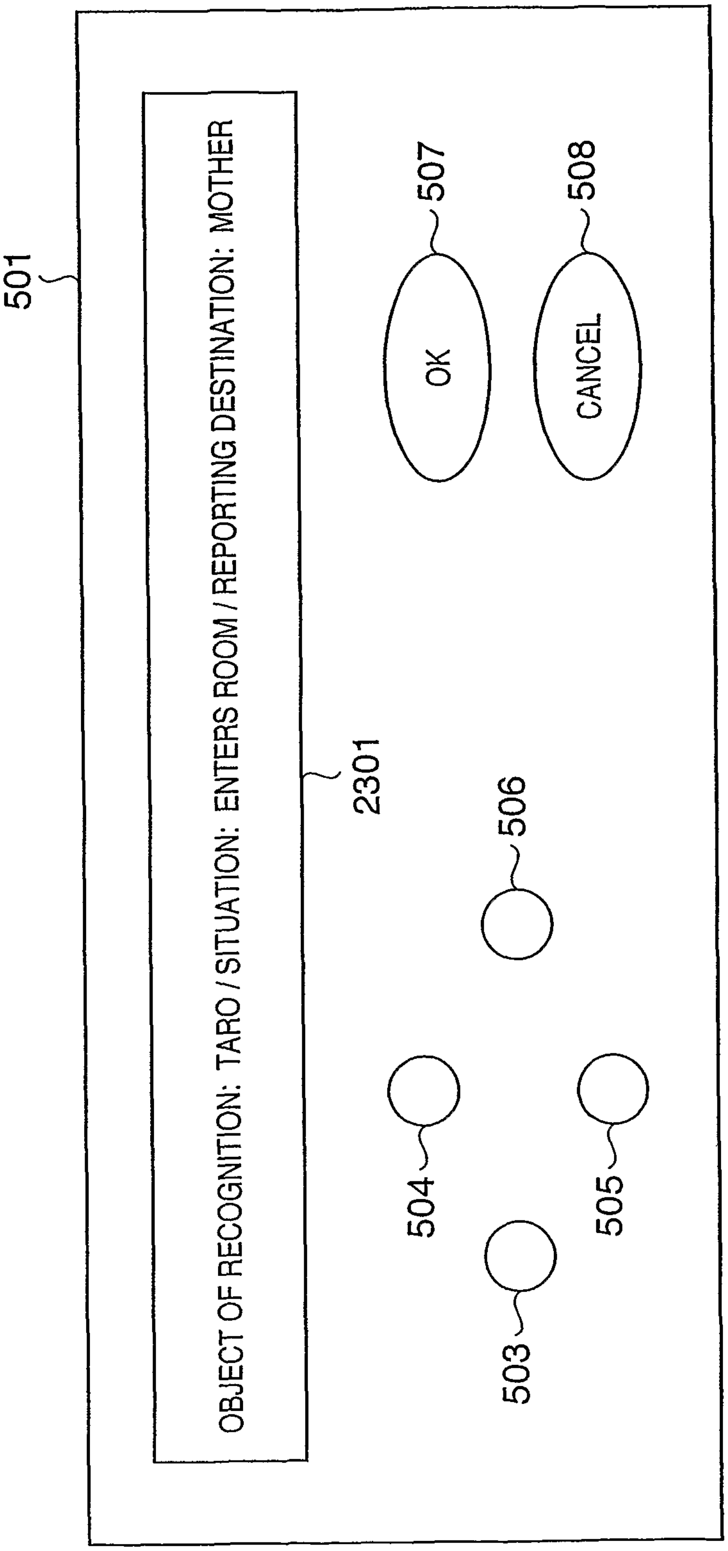
FIG. 23 is a diagram showing the control panel of the controls shown in FIG. 4.

First, in step S2402, the user is prompted to set the object of recognition through the controls 409 (reference numeral 901 in FIG. 9). It should be noted that FIG. 9 shows sample display contents displayed on the LCD 2301 (FIG. 23) of the controls 409.

Here, when buttons 504-505 are pressed, previously registered persons are displayed in succession (902-904). When button 506 is pressed, the person currently displayed is set as the target of a reporting event occurrence. When selection of the situation recognition content is completed and the OK button 507 is pressed, the person who is the object of recognition at the current place of installation is set in a reporting control information table (FIG. 25).

The reporting control information table is table data stored in the EEPROM 406 or the like, and is checked when determining a reporting destination to be described later. In other words, the reporting destination during a reporting event occurrence is controlled by checking this table. It should be noted that, when a person other than one previously registered is selected, then processing proceeds to registration of the person who is the object of recognition (905) from a new registration screen (not shown). In the registration process (905), video of the person to be registered is imaged and the feature parameters necessary to recognize such registered person is extracted from this video data. Furthermore, in the registration process (905), the user is prompted to enter attribute information for the registered person (such as name, etc.).

FIG. 25 shows a sample reporting control information table showing the relation between a person who is the object of recognition, the content of the reporting and the reporting destination. The location code is a unique code assigned to the location recognized in the place of installation recognition step S2202. The person code is a unique code assigned to previously registered persons.

It should be noted that it is also possible to establish a plurality of persons as the object of recognition for a location (as in the case of location code P0002 shown in FIG. 25). In this case, an order of priority of the objects of recognition may be added to the reporting control information table. If an order of priority is established, then in a process of analyzing the content of the situation (step S2205) the situation of a person of higher priority is subjected to recognition processing more frequently. Furthermore, sometimes a particular person who is an object of recognition is not set for a given location (as in the case of location code P0004 in FIG. 25). In this case, when a predetermined situation at that location is recognized (such as intrusion by a person), the reporting process is executed in step S2209 regardless of the output of the object recognition process of step S2206.

Figure 26:
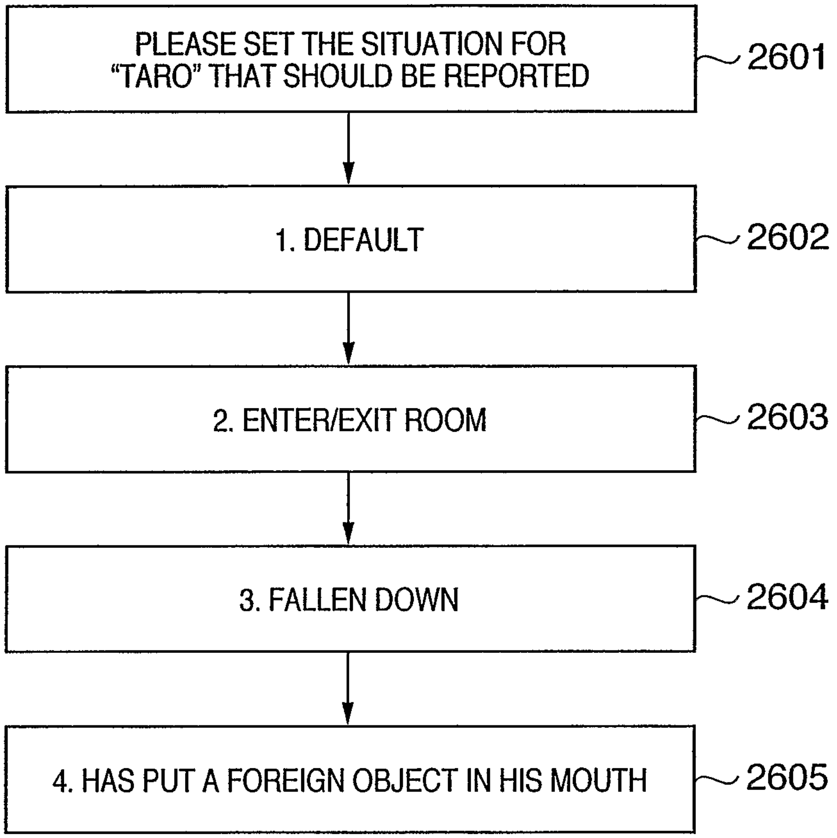
FIG. 26 is a diagram showing sample display contents displayed on the LCD of the controls.

Next, in step S2403, the content of the situation for which reporting is to be carried out is set for each person who is the object of recognition. FIG. 26 shows one example of display contents displayed on the LCD 2301 of the controls 409. When buttons 504-505 are pressed, previously registered recognition situation contents are displayed in succession. When button 506 is pressed, the situation currently displayed is set as the reporting occurrence situation for that person who is the object of recognition object of recognition.

When selection of the situation content is completed and the OK button 507 is pressed, the situation content at the current place of installation is set in the reporting control information table (FIG. 25). It should be noted that when the “default” (2602) is set or when there is no input from the user for a predetermined period of time, the content is automatically set to the default setting. The default is such that a situation ordinarily set in most cases, such as recognition of “room entry and exit” and the like, is automatically designated, thereby eliminating the inconvenience attendant upon setting.

Figure 27:
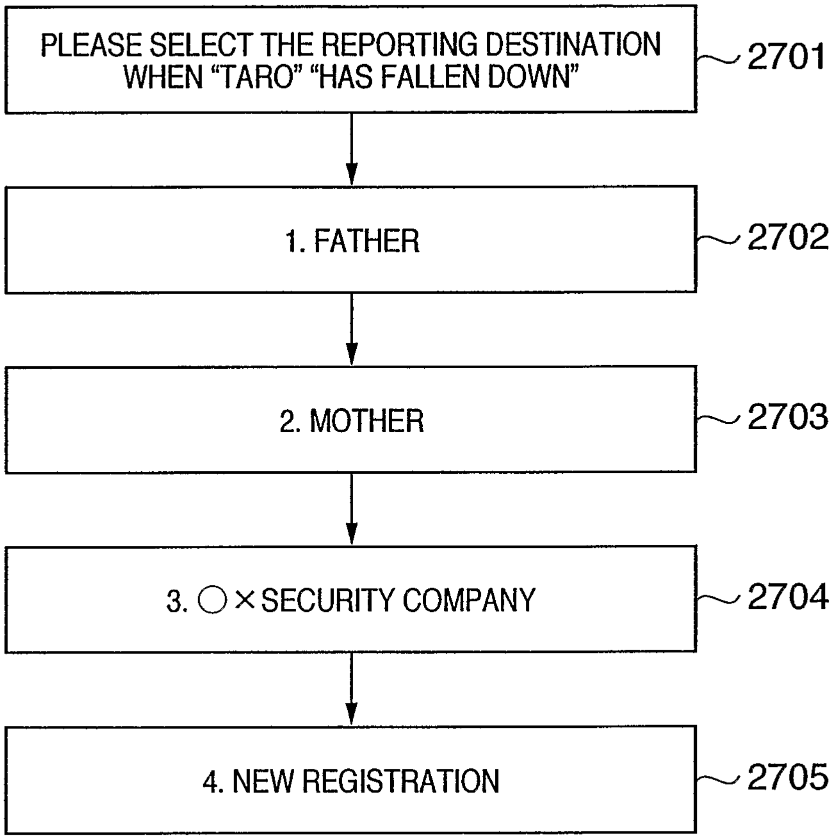
FIG. 27 is a diagram showing a sample display of a report destination setting screen displayed on the LCD of the controls.

Next, in step S2404, the reporting destination for the reporting is set for each object of recognition and its situation content. FIG. 27 shows a sample display of a reporting destination setting screen displayed on the LCD 2301 of the controls 409. When buttons 504-505 are pressed, previously registered reporting destinations are displayed in succession. When button 506 is pressed, the reporting destination currently displayed is set as the reporting destination when a situation of the person who is object of recognition is recognized.

When selection of the situation to be recognized is completed and the OK button 507 is pressed, the reporting destination is set in the reporting control information table (FIG. 25). It should be noted that, if a “new registration” (2705) is set, then a predetermined interface, not shown, is displayed on the predetermined control panel 501 and registration of a new reporting destination is carried out. In addition, it is also possible to set a plurality of reporting destinations for a single situation.

As described above, in steps S2402-S2404 the reporting control information table (FIG. 25) for a given location is set. To explain in specific terms using FIG. 25, if the location code is P0002, the query “Has person fallen?” is set as the reporting condition for person H1001 and a report to that effect is made to “Father” if that condition is recognized.

In addition, the queries “Has person put something in his mouth” and “Is person in a prohibited area?” are set as reporting conditions for person H1002, and reports are made to that effect to “Mother” and “Older Brother” if situations of such conditions are recognized. It should be noted that in the case of locations for which no particular persons are registered, the system recognizes the situations of all persons or the situation of that location (such as the outbreak of a fire and so forth). For example, in FIG. 25, at location P0004, such recognition processes as detection of the entry of all persons or detection of a suspicious person are executed and a report to that effect is made to “Security Company” if intrusion by a person is detected.

As described above, in step S2203, the object of recognition, the situation to be recognized and the corresponding reporting destination are recorded in the reporting control information table.

Next, in step S2204, it is determined whether or not there has been a change in situation. Here, for example, using the difference between frames of image data, the system detects changes in image in the area of the object of recognition. If a change beyond a predetermined area is confirmed in this step, then in step S2205 the process of analyzing the content of the situation of the target object is commenced. It should be noted that, in step S2204, for example, a change in situation may be detected using information other than image data. For example, a technique may be used in which intrusion by a person is detected using a sensor that uses infrared rays or the like. In this step, a change in the situation (such as the presence of a person) is detected with a simple process and the process of analyzing the content of the situation (step S2205) is executed only when necessary.

When a change in situation is detected, in step S2205 the process of analyzing the change in situation is executed. In step S2205, a person within the sensing range is tracked and the situation of that person is analyzed. It should be noted that it is possible to utilize any of the variety of methods proposed conventionally for the necessary situation recognition technique. For example, detection of the entry into a room of a particular person or the entry of a suspicious person into the room can be accomplished easily using individual identification results produced by face detection/face recognition techniques. In addition, many techniques for recognizing facial expression have been proposed, such as the device proposed by Japanese Laid-Open Patent Publication No. 11-214316 that recognizes such expressions as pain, excitement and so forth.

Furthermore, a situation in which an infant has put a foreign object into his or her mouth also can be recognized from recognition of hand movements proposed in conventional sign language recognition and the like and from information concerning the position of the mouth obtained by detection of the face. Furthermore, in Japanese Laid-Open Patent Publication No. 6-251159, a device that converts feature vector sequences obtained from time series images into symbol sequences and selects the most plausible from among the object of recognition categories based on a hidden Markov model is proposed.

In addition, in Japanese Laid-Open Patent Publication No. 01-268570, a method of recognizing a fire from image data is proposed. In step S2205, processing modules including this plurality of situation recognition algorithms are executed, the output values of the processes are determined and whether or not a predetermined situation has occurred is output.

Figure 35:
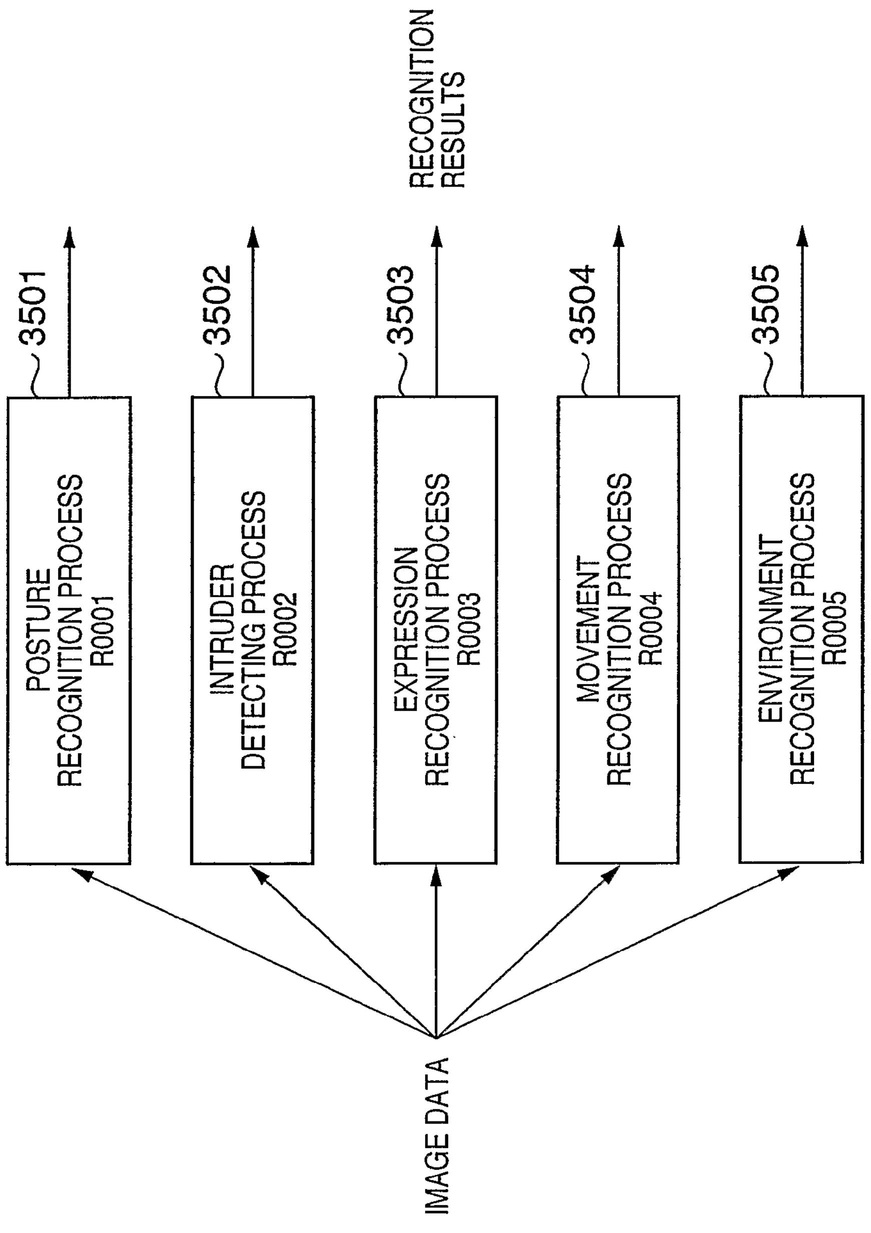
FIG. 35 is a diagram showing a sample recognition process software module provided in step S2205.

FIG. 35 is a diagram showing one example of a recognition processing software module provided in step S2205. Reference numerals 3501-3505 correspond to a module for recognizing the posture of a person, a module for detecting an intruder in a predetermined area, a module for recognizing a person’s expressions, a module for recognizing predetermined movements of a person, and a module for recognizing environmental situations (that is, recognition of particular situations such as a fire or the like), respectively, which process image data imaged by the video input unit 410 (and stored in the RAM 405).

The modules operate as middle ware tasks either by time division or serially. In this step, the output values of the modules are output as the results of analysis of data encoded into a predetermined format. It should be noted that these modules may also be implemented as special hardware modules. In that case, the hardware modules are connected to the system bus 404 and process the image data stored in the RAM 405 at a predetermined time.

In step S2206, the person who is the object of recognition of the situation recognized in the process of analyzing the content of the situation (step S2205) is recognized. Any of the variety of techniques proposed conventionally can be adapted to that processing relating to recognition of the person which is necessary to this step (e.g., S. Akamatsu: “Research Trends in Face Recognition by Computer", Transactions of the Institute of Electronics, Information and Communication Engineers, vol. 80 No. 3, pp. 257-266 (March 1997)). It should be noted that the feature parameters needed to identify an individual are extracted during new registration of the individual as described above (reference numeral 905 shown in FIG. 9).

In step S2207, the reporting control information table is checked and it is determined whether or not a predetermined situation of a predetermined person which should be reported has been recognized, and if so, in step S2208 the process of encoding the content of the situation is carried out. It should be noted that although in FIG. 25 the description of the situation content that is reported is shown as words expressing a predetermined situation, in actuality a code corresponding to predetermined code data, not shown, that the process of analyzing the content of the situation (step S2206) outputs (that is, a code uniquely specifying a corresponding situation) is recorded in the table.

Next, a process of encoding the content of the situation (step S2208) converts the situation content into predetermined character information using the output from the process of analyzing the content of the situation (step S2206). This conversion may, for example, provide a conversion table determined in advance, with the character information obtained from the output of the process of analyzing the content of the situation (step S2206) and the content of such table.

FIG. 28 is a diagram showing a sample conversion table. For example, a situation recognition processing module R0001 (corresponding to the recognition module 3501 shown in FIG. 35), recognizes and outputs three types of situations for a person. A situation recognition processing module R0003 (corresponding to the recognition module 3503 shown in FIG. 35), recognizes and outputs two types of situations for a person. If a predetermined output is obtained from the recognition processing modules (reference numerals 3501-3505 shown in FIG. 35), the conversion table is checked and the corresponding predetermined character sequence is output. Thus the process of encoding the content of the situation (step S2208), using the output values (predetermined codes) of the process of analyzing the content of the situation (step S2205), obtains character information by checking the conversion table. It should be noted that the conversion table is assumed to be recorded in advance in the EEPROM 406.

Figure 36:
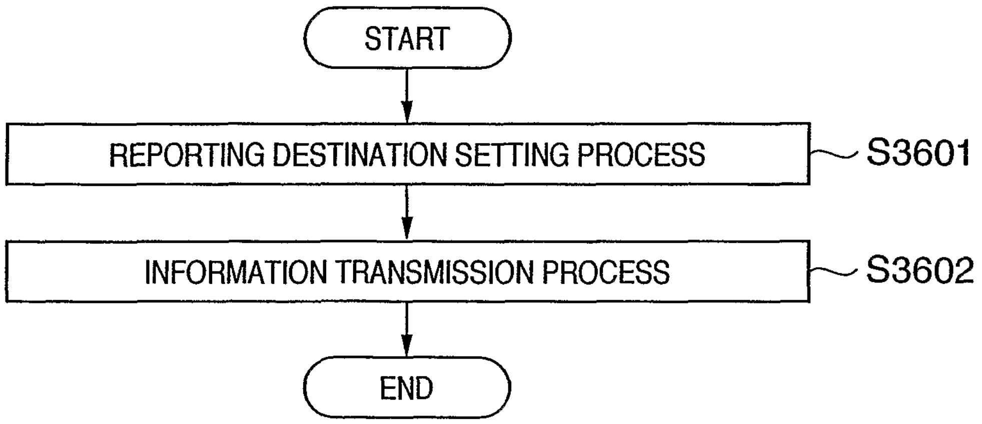
FIG. 36 is a flow chart illustrating details of the reporting process (S2209)

FIG. 36 shows details of the reporting process (step S2209). In this step, the person to be notified is determined on the basis of the output of the process of identifying the place of installation (step S2202), the process of analyzing the content of the situation (step S2205) and the process of identifying the object of recognition (step S2206), and by checking the reporting control information table (FIG. 25) stored in the EEPROM 406 in step S3601.

Next, in step S3602, the character information obtained in the situation encoding process (step S2208) is transmitted to the person to be notified. The character information is transmitted via the communications interface 408 in accordance with a protocol such as electronic mail, instant messaging or the like. It should be noted that the selection of the reporting destination, in the case of e-mail, is accomplished by establishing a particular e-mail address for the reporting destination.

It should be noted that, after power is supplied to the main unit, the processes of steps S2204-S2209 are executed repeatedly, and when a predetermined situation is recognized, the content of the situation is reported to the person to be notified in that situation.

As can be understood from the foregoing description, according to the present embodiment, when a predetermined situation is recognized the content of that situation can be easily grasped, and furthermore, the appropriate reporting destination can be notified of the content of that situation depending on the place of installation of the device, the object of recognition and the situation to be recognized.

Fifth Embodiment

Figure 30:
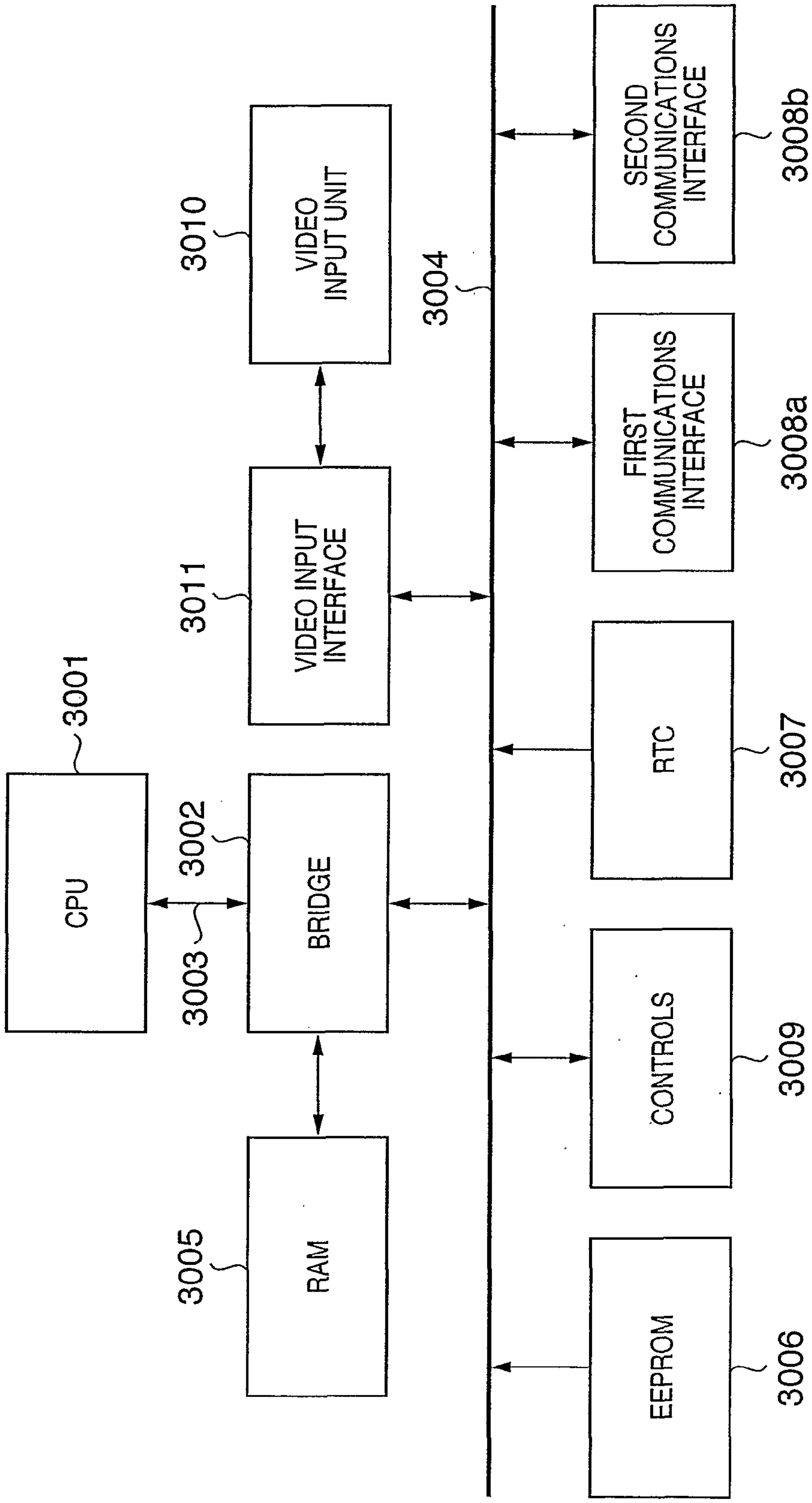
FIG. 30 is a diagram showing the structure of a situation monitoring device according to a fourth embodiment of the present invention.

FIG. 30 is a diagram showing the structure of a situation monitoring device according to a fifth embodiment of the present invention. The hardware configuration of this embodiment differs from that of the first embodiment shown in FIG. 4 only insofar as the communications interface 408 is different.

Reference numeral 3001 designates a CPU. Reference numeral 3302 designates a bridge, which has the capability to bridge a high-speed CPU bus 3003 and a low-speed system bus 3004.

In addition, the bridge 3002 has a built-in memory controller function, and thus the capability to control access to a RAM 3005 connected to the bridge. The RAM 3005 is the memory necessary for the operation of the CPU 3001, and is composed of large-capacity, high-speed memory such as SDRAM/DDR/RDRAM and the like. In addition, the RAM 3005 is also used as an image data buffer and the like.

Furthermore, the bridge 3002 has a built-in DMA function that controls data transfer between devices connected to the system bus 3004 and the RAM 3005. An EEPROM 3006 is a memory for storing the instruction data and a variety setting data necessary for the operation of the CPU 3001.

Reference numeral 3007 designates an RTC IC, which is a special device for carrying out time management/calendar management. Reference numeral 3009 designate the controls, and is a processor that controls the user interface between the main unit and the user. The controls 3009 are incorporated in a rear surface or the like of a stand 304 of the main unit. Reference numeral 3010 designates a video input unit, and includes photoelectric conversion devices such as CCD/CMOS sensors as well as the driver circuitry to control such devices, the signal processing circuitry to control a variety of image corrections, and the electrical and mechanical structures for implementing pan/tilt mechanisms.

Reference numeral 3011 designates a video input interface, which converts raster image data output from the video input unit 3010 together with a sync signal into digital image data and buffers it. In addition, video input interface 3011 has the capability to generate signals for controlling the video input unit 3010 pan/tilt mechanism. The digital image data buffered by the video input interface 3011 is, for example, forwarded to the predetermined address in the RAM 3005 using the DMA built into the bridge 3002.

Such DMA transfer may, for example, be activated using the video signal vertical sync signal as a trigger. The CPU 3001 then commences processing the image data held in the RAM 3005 based on a DMA transfer-completed interrupt signal that the bridge 3002 generates. It should be noted that the situation monitoring device also has a power supply, not shown.

Reference numeral 3008*a* designates a first communications interface, having the capability to connect to a wireless/wire LAN internet protocol network. Reference numeral 3008*b* has the capability to connect directly to an existing telephone network or mobile telephone network. In the present embodiment, the reporting medium is selected according to the object to be recognized and the situation thereof. Specifically, when reporting a normal situation, depending on the degree of urgency the information is reported using an internet protocol such as electronic mail, instant messaging or the like. If the situation is an urgent one, then the situation content is reported directly by telephone or the like.

Figure 31:
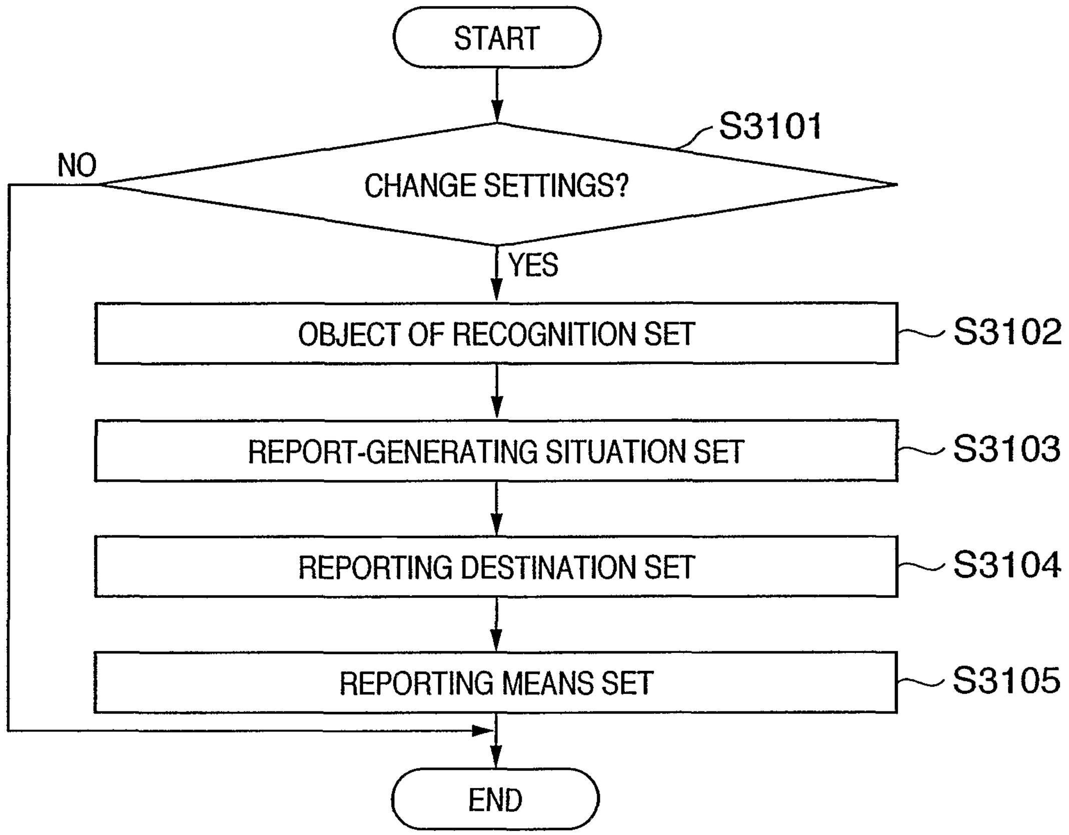
FIG. 31 is a flow chart illustrating details of a report destination setting process (step S2203)

FIG. 31 is a flow chart illustrating details of the reporting destination setting process (step S2203) according to the present embodiment. In this embodiment, compared to the fourth embodiment described above a new reporting medium setting process (step S3105) is added. The other steps S3101-S3104 are the same as steps S2401-S2404 described in the fourth embodiment, and a description thereof is omitted.

FIG. 32 is a diagram showing the content of the reporting control information table used in the present embodiment. In the reporting medium setting process (step S3105), the reporting medium is set according to the place of recognition, the object of recognition and the content of the situation. In the case of FIG. 32, it is specified that reporting is to be "by telephone" for such extremely urgent situations as "Has person fallen?" and "Suspicious person detected". By contrast, "by instant messaging" is specified for such situations of intermediate urgency as "Is person in pain?", "Has person put something in his mouth?" and "Is person in a prohibited area?", and "by e-mail" is specified for such situations of lesser urgency as "Entry/exit confirmed".

The information set in step S3105, as with the fourth embodiment described above, is then recorded in the EEPROM 3005 as the reporting control information table.

In the situation content encoding process (step S2208) of the present embodiment, the situation content is encoded according to the reporting medium set in the reporting medium setting process (step S2203). For example, character information is encoded if "instant messaging" or "e-mail" are set as the reporting medium, and voice information is encoded if "telephone" is set as the reporting medium. The encoding of voice information generates voice data corresponding to the character sequence shown in the table shown in FIG. 28 by a voice synthesis process, not shown. It should be noted that such voice data may be compressed using high-efficiency compression protocols such as ITU standard G.723 or G.729. The voice information thus generated is then temporarily stored in the RAM 3005 or the like.

Figure 37:
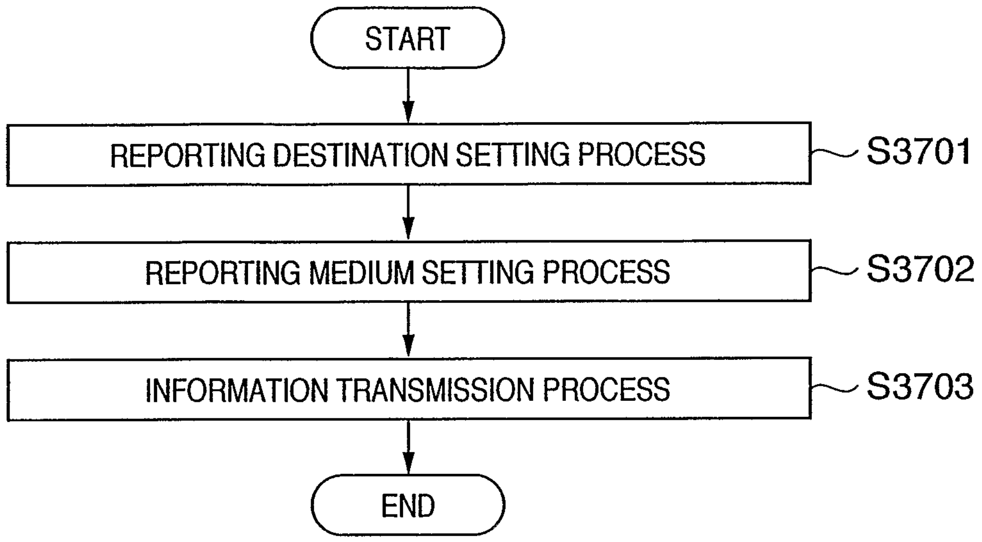
FIG. 37 is a flow chart illustrating details of the reporting process (S2209)

FIG. 37 is a diagram illustrating details of the reporting process (S2209). In step S3701, the reporting control information table (FIG. 32) stored in the EEPROM 3006 is checked and a predetermined reporting destination is determined according to the output of the process of identifying the place of installation (step S2202), the output of the process of identifying the object of recognition (step S2206) and the output of the process of analyzing the content of the situation (step S2205).

Next, in step S3702, similarly, the reporting control information table is checked and the reporting medium determined. Encoded information expressing the content of the situation is then transmitted to the reporting destination selected in step S3702 through the selected reporting medium (3008*a* or 3008*b*). In other words, if "instant messaging", "e-mail" or the like is selected as the reporting medium, the report content is transmitted according to internet protocol through the first communications interface 3008*a*. If "telephone" is selected as the reporting medium, then the telephone of the predetermined reporting destination is automatically called and after ringing is confirmed the voice data held in the RAM 3005 is transmitted as direct audio signals through the second communications interface 3008*b*.

Thus, according to the present embodiment, it is possible to notify a predetermined reporting destination by reporting medium selected according to the situation, achieving a reporting capability suited to the degree of urgency.

Sixth Embodiment

Figure 33:
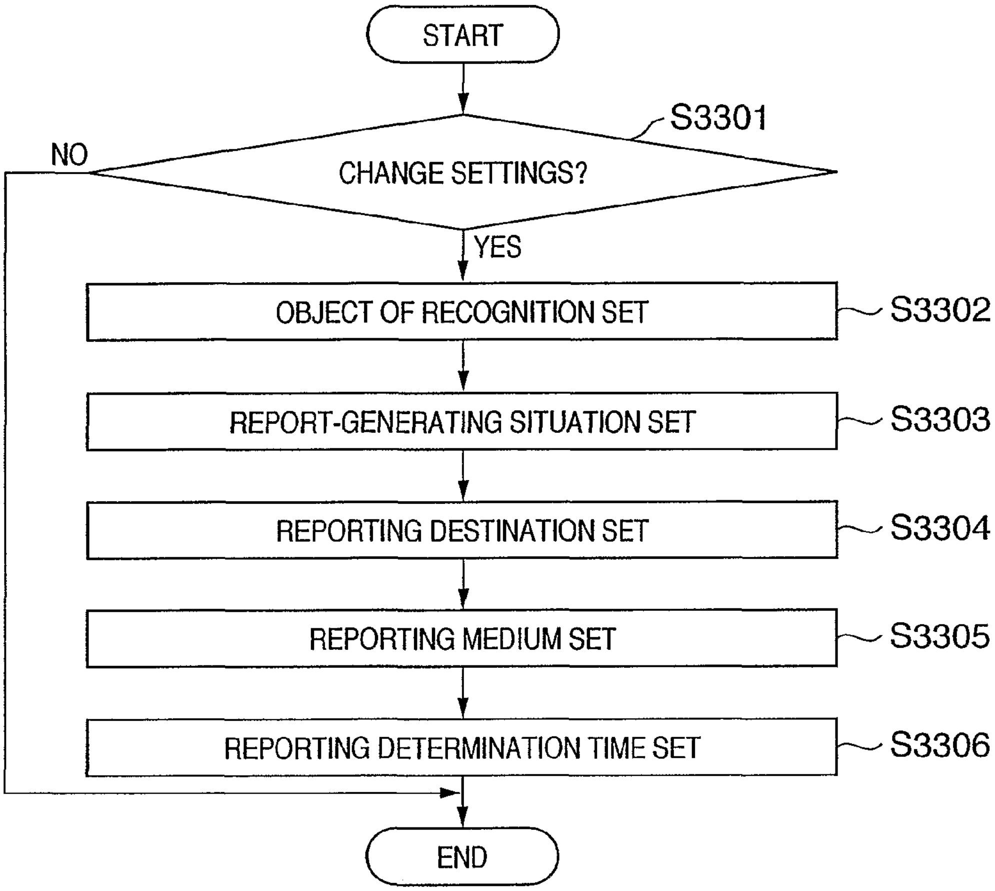
FIG. 33 is a diagram showing an outline of the processing flow of a situation monitoring device according to a fifth embodiment of the present invention.

FIG. 33 is a diagram showing the outlines of a processing flow performed by a situation monitoring device according to a sixth embodiment of the present invention. The flow chart is a program loaded in the RAM 3005 and processed by the CPU 3001. The hardware configuration of the situation monitoring device according to the present embodiment is the same as that of the fifth embodiment, and therefore a description is given only of the difference between the two.

FIG. 33 is a flow chart illustrating details of the reporting destination setting process (step S2203) of the present embodiment. In this embodiment, in contrast to the reporting destination setting process of the fifth embodiment, a reporting determination time setting process step (S3306) is newly added. The remaining steps S3301-S3305 are each the same as steps 3101-S3105 described in the fourth embodiment, and thus a description of only the difference therebetween is given.

FIG. 34 is a diagram showing one example of a reporting control information table according to the present embodiment. In the event that time information corresponding to recognition situations is set and a predetermined situation is recognized, that recognized time is determined and the content of the recognition situation is reported to the reporting destination in accordance with the time. For example, in the case of location code P0003, if an intruder is detected between the hours of 0800 and 2400, the system is set to notify the mother by electronic mail. By contrast, if an intruder is detected between the hours of 2400 and 800 under the same conditions, the system is set to notify the security company. The information set in step S3306, as with the fourth embodiment, is recorded in the EEPROM 3006 as a reporting control information table.

Figure 38:
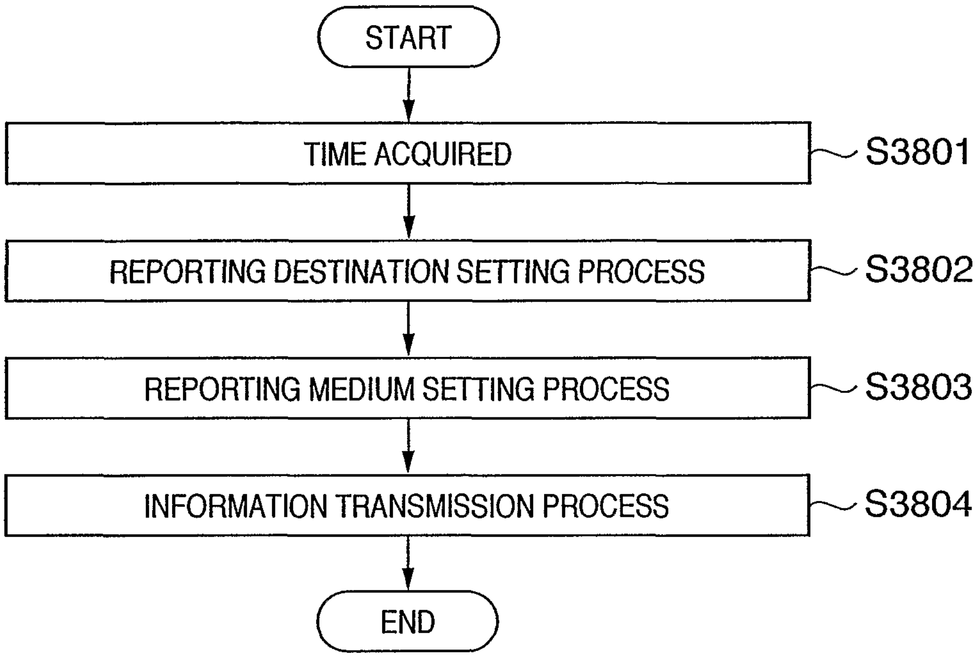
FIG. 38 is a flow chart illustrating details of the reporting process (S2209).

FIG. 38 is a flow chart illustrating details of the reporting process (step S2209) according to the present embodiment. In step S3801, the time that a predetermined situation is recognized is obtained from the RTC 3007. In step S3802, based on the place of recognition, the person who is the object of recognition, the recognition situation and the time obtained in step S3801, the reporting control information table (FIG. 34) stored in the EEPROM 3006 is checked and a predetermined reporting destination determined.

Furthermore, in step S3803, the reporting control information table is similarly checked and a predetermined reporting medium determined. In step S3804, data encoded in step S2208 showing the content of the situation is transmitted to the reporting destination determined in step S3803 through reporting medium determined in step S3804.

As can be understood from the foregoing description, with the present embodiment, based on the time when a predetermined situation is recognized, it is possible to report to more appropriate reporting destinations using more appropriate reporting medium.

It should be noted that although the foregoing embodiments are described in terms of a person as the object of recognition, the present invention is not limited thereto and the object of recognition may be an animal, a particular object or anything else. For example, in the case of a particular object, situations such as that object "Has been moved from a predetermined position" or "Has gone missing" may be recognized and reported. The recognition of movement or presence/absence can be easily accomplished by the use of pattern matching techniques proposed conventionally.

Although in the foregoing embodiments the reporting control information table specifies the reporting destination and reporting medium depending on the place of installation of the device and the object of recognition, the time and the situation, the present invention is not limited thereto. Depending on the purpose, a table that designates the reporting destination or the reporting medium according to at least one of the place of installation, the object of recognition and the time as well as the situation may be provided.

Although the foregoing embodiments are described in terms of the process of analyzing the content of the situation by providing a plurality of situation recognition processes and utilizing the output of those processes to analyze the situation content, the present invention is not limited thereto and any method may be used. For example, a more generalized recognition algorithm may be installed and all target situations recognized.

Although the foregoing embodiments are described in terms of encoding the results of the process of analyzing the content of the situation as predetermined character sequences or audio information, the present invention is not limited thereto and these results may be converted into other types of information. For example, such information may be converted into diagrammatic data that expresses the information schematically, and such diagrammatic data transmitted as reporting data. In addition, instead of reporting over a network, a method may be used in which light patterns from a predetermined light source are reported as warning information.

Although the fourth embodiment described above is described in terms of using video information to recognize the place of installation of the device and the situation of the object of recognition, the present invention is not limited thereto and sensing information other than video information may be used to recognize the situation. Furthermore, situations may be recognized using a combination of video information and other sensing information. As other sensing information it is possible to use a variety of sensing technologies such as audio information, infrared ray information and electromagnetic information.

Although the foregoing embodiments are described in terms of the medium that report a change in the situation of the object of recognition as internet mail, instant messaging and telephone, etc., the present invention is not limited thereto and other medium may be used as necessary.

Although the foregoing embodiments are described in terms of establishing the reporting control information table using the controls 409, alternatively a network may be used to set the parameters necessary for operation. In this case, the main unit may have a HTTP (Hyper Text Transfer Protocol) server capability, for example, and provide a Web-based user interface to the user through the communications interface 3008. The HTTP server is incorporated as one type of middle ware, and activates a predetermined parameter setting program in response to operation from a remote location based on HTTP.

In this case, the user can set the parameters necessary for operation of the main unit from an ordinary terminal such as a mobile telephone, a PDA or a personal computer, and furthermore, such setting operations can be carried out from a remote location.

Although the foregoing embodiments are described in terms of executing all processing such as the recognition processing using a processor built into the main unit, the present invention may be implemented, for example, in combination with an external processing device such as a personal computer or the like. In this case, only the reading in of image data is accomplished using a specialized device, with the remaining processes, such as image recognition and communications, implemented using personal computer resources.

By using a wireless interface such as BlueTooth, for example, or a power line communications interface such as HPA (Home Power Plug Alliance) or the like to connect the specialized device and the personal computer, the same convenience can be achieved. This sort of functionally dispersed situation monitoring system can of course be achieved not only with the use of a personal computer but also with the aid of a variety of other internet appliances as well.

Although the foregoing embodiments are described in terms of implementing the present invention by software processing using a CPU, the present invention is not limited thereto and may, for example, be implemented by special hardware processing as well. In that case, the algorithm for situation recognition corresponds to object data that determines the internal circuitry of an FPGA (Filed Programmable Gate Array) or object data that determines the internal circuitry of a reconfigurable processor. The system control processor loads the data from the EEPROM 406 or a server device connected to the network and the like into the special hardware. The special hardware then commences recognition processing of a predetermined algorithm according to the object data that has been loaded.

Although the foregoing embodiments are described in terms of using a camera having a mechanical control structure (a so-called pan/tilt camera), the present invention is not limited thereto and may, for example employ a wide-angle camera instead. In that case, the object of recognition is not supplemented mechanically but instead an equivalent process can be implemented using image data acquired at wide angles.

Other Embodiments

It should be noted that the present invention can be adapted to a system comprised of a plurality of devices (for example, a host computer, an interface device, a reader, a printer and so forth) or to an apparatus comprised of a single device.

In addition, the invention can be implemented by supplying a software program, which implements the functions of the foregoing embodiments, directly or indirectly, to a system or apparatus, reading the supplied program code with a computer (or CPU or MPU) of the system or apparatus, and then executing the program code.

In this case, the functions of the foregoing embodiments are implemented by the program code itself read from the storage medium, and the storage medium storing the program code constitutes the invention.

Examples of storage media that can be used for supplying the program code are a floppy disk (registered trademark), a hard disk, an optical disk, a magneto-optical disk, a CD-ROM, a CD-R, magnetic tape, a nonvolatile type memory card, a ROM or the like.

Besides those cases in which the aforementioned functions according to the embodiments are implemented by executing the program code read by computer, the present invention also includes a case in which an OS (operating system) or the like running on the computer performs all or part of the actual processing according to the program code instructions, so that the functions of the foregoing embodiments are implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

The present invention is not limited to the above embodiments and various changes and modifications can be made within the spirit and scope if the present invention. Therefore, to apprise the public of the scope of the present invention, the following claims are made.

CLAIM OF PRIORITY

This application claims priority from Japanese Patent Application No. 2004-167544 filed on Jun. 4, 2004 and Japanese Patent Application No. 2005-164875 filed on Jun. 3, 2005, the entire contents of which are hereby incorporated by reference herein.

The invention claimed is:

1. A situation monitoring device comprising:

a place recognition unit configured to recognize a place of installation where the situation monitoring device is installed, wherein the place recognition unit commences a process of recognition of the place of installation when a change in a sensed image is detected;

a table holding unit configured to hold a recognition information table in which an object to be recognized and a type of a situation to be recognized for the object is stored in correspondence with the place of installation;

a determination unit configured to determine an object to be recognized and a type of a situation to be recognized for the object, by referring to the recognition information table in accordance with the place of installation recognized by the place recognition unit;

a situation recognition unit configured to recognize a situation of the type determined by the determination unit for the object; and a communications unit configured to report the situation for the object recognized by the situation recognition unit to a user.

2. The situation monitoring device according to claim 1, wherein the type of the situation to be recognized includes a target object to be recognized and a situation of the target object to be recognized.

3. The situation monitoring device according to claim 1, wherein the situation recognition unit comprises an acquisition unit configured to acquire image data, and recognizes the predetermined situation from the acquired image data.

4. The situation monitoring device according to claim 1, wherein the place recognition unit comprises an acquisition unit configured to acquire image data, and recognizes the place of installation from the acquired image data.

5. The situation monitoring device according to claim 1, wherein the place recognition unit comprises a sensor for detecting movement of the situation monitoring device and the predetermined condition is a change in such sensor information.

6. The situation monitoring device according to claim 1, further comprising controls for inputting parameters necessary for operation of the situation monitoring device, and the predetermined condition is a particular input by a user to the controls.

7. The situation monitoring device according to claim 1, wherein the predetermined condition is power on of the situation monitoring device.

8. The situation monitoring device according to claim 1, wherein the predetermined condition is a time determined in advance.

9. The situation monitoring device according to claim 1, wherein the communications unit further reports to a user that a shift in the place of installation has been recognized by the place recognition unit.

10. The situation monitoring device according to claim 1, wherein the communications unit further reports to a user that an object to be recognized has changed.

11. The situation monitoring device according to claim 1, further comprising controls for inputting parameters necessary for operation of the situation monitoring device and an interface prompting a user to update the relational information under predetermined conditions is displayed on the controls.

12. The situation monitoring device according to claim 11, wherein the predetermined condition is the place recognition unit recognizing a shift in the place of installation.

13. The situation monitoring device according to claim 11, wherein the predetermined condition is the place recognition unit recognizing a place of installation that is not registered in the relational information.

14. The situation monitoring device according to claim 11, wherein the predetermined condition is recognition of a target object that is not registered in the relational information.

15. The situation monitoring device according to claim 1, wherein a situation of a default determined in advance is determined by the determination unit when the place recognition unit recognizes a place of installation that is not registered in the relational information.

16. The situation monitoring device according to claim 1, wherein a situation of a default determined in advance is determined by the determination unit when a target object that is not registered in the relational information is recognized.

17. The situation monitoring device according to claim 1, wherein the situation recognition unit recognizes a situation in accordance with an order of priority determined in advance when a plurality of target objects exist for a recognized location.

18. The situation monitoring device according to claim 1, wherein the situation monitoring device has a configuration dispersed in a main part and a peripheral part, and information for recognizing the place of installation with the place recognition unit is held in the peripheral part.

19. The situation monitoring device according to claim 1, wherein the place recognition unit further comprises external communications unit for communicating with an external device disposed adjacent to an external apparatus or a main unit, and recognizes the place of installation according to information emitted by the external apparatus or information held by the external device.

20. The situation monitoring device according to claim 1, further comprising controls separate from a main unit and controls communications unit for communicating with the controls, wherein setting of parameters necessary for operation of the device is carried out using the controls.

21. A situation monitoring device according to claim 1, further comprising connection unit for connecting to a network and a server device, wherein setting of parameters necessary for operation of the situation monitoring device is carried out from an external apparatus using the server device.

22. The situation monitoring device according to claim 21, wherein the server device is a HTTP (Hyper Text Transfer Protocol) server.

23. A situation monitoring system comprising:

the situation monitoring device according to claim 1; and connection unit for connecting to a network, wherein a processing algorithm executed by the situation recognition unit is held in an external apparatus connected to the network.

24. A method of controlling a situation monitoring device, the method comprising:

a place recognition step of recognizing a place of installation where the situation monitoring device is installed, wherein a process of recognition of the place of installation is commenced when a change in a sensed image is detected;

a table holding step of holding a recognition information table in which an object to be recognized and a type of a situation to be recognized for the object is stored in correspondence with the place of installation;

a determination step of determining an object to be recognized and a type of a situation to be recognized for the object, by referring to the recognition information table in accordance with the place of installation recognized in the place recognition step;

a situation recognition step of recognizing a situation of the type determined in the determination step for the object; and a communications step of reporting the situation for the object recognized in the situation recognition step to a user.

25. A non-transitory computer-readable storage medium retrievably storing computer-executable program code which, when executed by a computer, causes the computer to perform a method of controlling a situation monitoring device, the storage medium comprising computer-executable program code for:

a place recognition step of recognizing a place of installation where the situation monitoring device is installed, wherein a process of recognition of the place of installation is commenced when a change in a sensed image is detected;

a table holding step of holding a recognition information table in which an object to be recognized and a type of a situation to be recognized for the object is stored in correspondence with the place of installation;

a determination step of determining an object to be recognized and a type of a situation to be recognized for the object, by referring to the recognition information table in accordance with the place of installation recognized in the place recognition step;

a situation recognition step of recognizing a situation of the type determined in the determination step for the object; and a communications step of reporting the situation for the object recognized in the situation recognition step to a user.

* * * * *